(12) United States Patent
Bradley, II et al.

(10) Patent No.: US 8,978,124 B2
(45) Date of Patent: Mar. 10, 2015

(54) SERVICE ORIENTED SECURE COLLABORATIVE SYSTEM FOR COMPARTMENTED NETWORKS

(71) Applicants: Charles B. Bradley, II, Largo, FL (US); Thomas D. Farley, Wimauma, FL (US); Jason S. Nadeau, St. Petersburg, FL (US)

(72) Inventors: Charles B. Bradley, II, Largo, FL (US); Thomas D. Farley, Wimauma, FL (US); Jason S. Nadeau, St. Petersburg, FL (US)

(73) Assignee: Raytheon Company, Waltham, MA (US)

( * ) Notice: Subject to any disclaimer, the term of this patent is extended or adjusted under 35 U.S.C. 154(b) by 157 days.

(21) Appl. No.: 13/653,049

(22) Filed: Oct. 16, 2012

(65) Prior Publication Data

US 2013/0097688 A1    Apr. 18, 2013

Related U.S. Application Data

(60) Provisional application No. 61/547,805, filed on Oct. 17, 2011.

(51) Int. Cl.
| | |
|---|---|
| *G06F 15/16* | (2006.01) |
| *G06F 17/30* | (2006.01) |
| *H04L 29/06* | (2006.01) |
| *G06F 21/62* | (2013.01) |
| *H04L 9/32* | (2006.01) |
| *G06F 15/173* | (2006.01) |
| *H04N 7/167* | (2011.01) |

(52) U.S. Cl.
CPC ............................ *G06F 21/6218* (2013.01)
USPC ................. 726/9; 726/5; 713/172; 713/174; 709/238; 380/229

(58) Field of Classification Search
USPC .......... 726/2–9; 713/168–174, 182–186, 202; 709/206, 225, 229, 249, 389
See application file for complete search history.

(56) References Cited

U.S. PATENT DOCUMENTS

| | | | | |
|---|---|---|---|---|
| 2007/0162400 | A1* | 7/2007 | Brew et al. | 705/59 |
| 2010/0037324 | A1* | 2/2010 | Grant et al. | 726/27 |
| 2011/0173445 | A1* | 7/2011 | Yami et al. | 713/166 |
| 2012/0258777 | A1* | 10/2012 | Huang | 455/557 |

* cited by examiner

*Primary Examiner* — Evans Desrosiers
(74) *Attorney, Agent, or Firm* — Schwegman Lundberg & Woessner, P.A.

(57) ABSTRACT

A system receives a request to store a document in a database, receives a user security token, analyzes the document to determine an adjudicated security level for the document, compares the user security token to the adjudicated security level, stores the document when the user security token is equal to the adjudicated security level, when the user security token is not equal to the adjudicated security level, queries the user as to whether the document should be stored with the adjudicated security level, receives a response to the query from the user, stores the document when the user agrees to store the document with the adjudicated security level, and when the user does not agree to store the document with the adjudicated security level, transmits a message to a security officer and quarantine the document.

18 Claims, 25 Drawing Sheets

US 8,978,124 B2

SERVICE ORIENTED SECURE COLLABORATIVE SYSTEM FOR COMPARTMENTED NETWORKS

PRIORITY CLAIM

This application claims priority under 35 USC 119 to U.S. Provisional Patent Application Ser. No. 61/547,805, filed Oct. 17, 2011 which is incorporated herein by reference in its entirety.

GOVERNMENT RIGHTS

This invention was not made with United States Government support. The United States Government does not have certain rights in this invention.

TECHNICAL FIELD

The present disclosure relates to compartmented networks, and in an embodiment, but not by way of limitation, a service oriented secure collaborative system for compartmented networks.

BACKGROUND

As security barriers within high assurance networks continue to erode between users, the local area networks (LANs), the program communities to which they belong, and the applications and data that they protect in order to facilitate collaboration, existing security mechanisms that provide the security are becoming inconsistent and inadequate.

BRIEF DESCRIPTION OF THE DRAWINGS

FIG. 2 is a block diagram of an automated adjudicated document check in;

DETAILED DESCRIPTION

Figure 1:
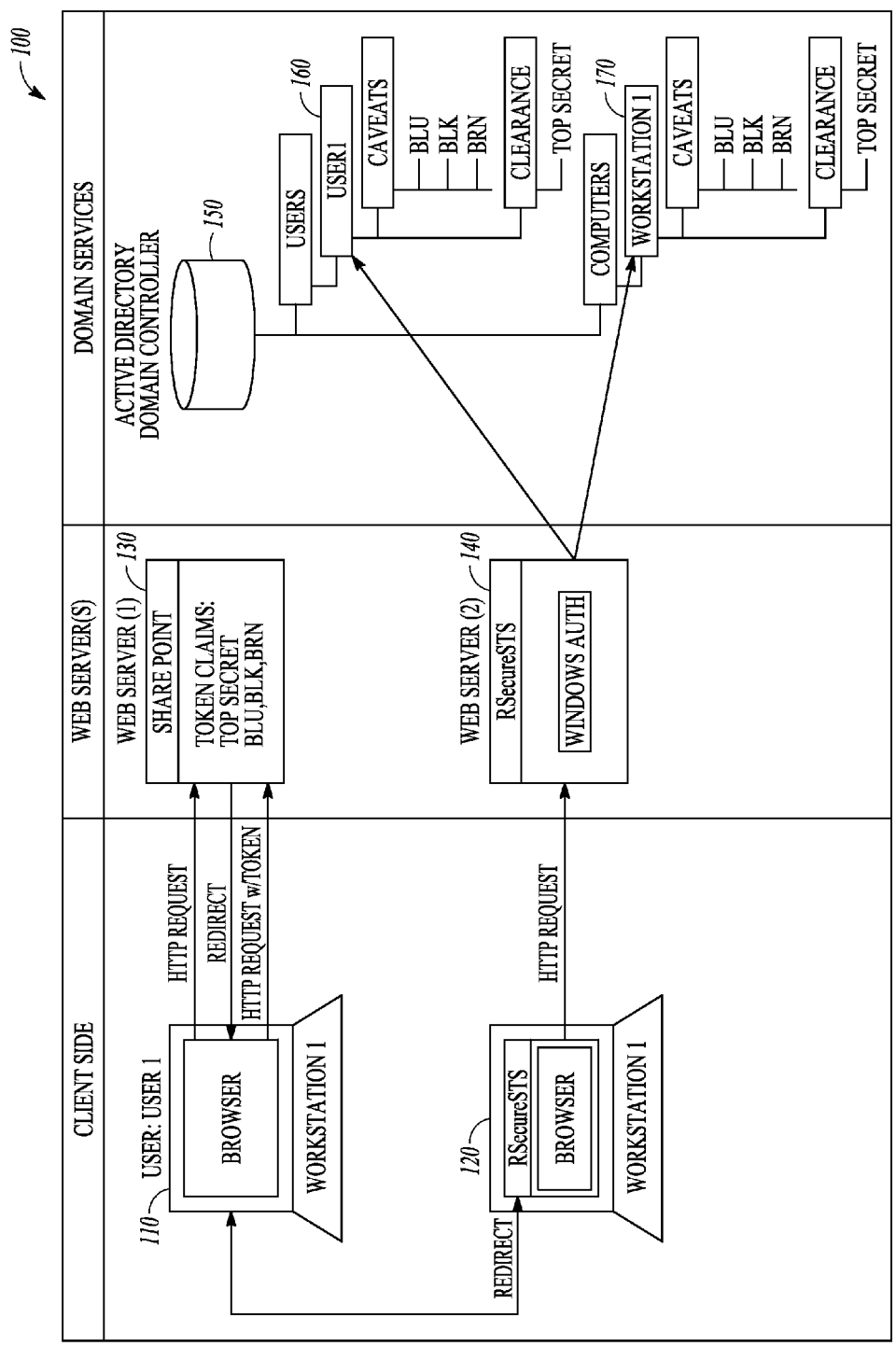
FIG. 1 illustrates a Secure Token Service (STS) in accordance with some embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

An embodiment relate to a high assurance network, a defense network (such as the Defense Information Systems Agency (DISA) Network Centric Enterprise Services (NCES), and a third party's framework (such as Microsoft's Windows Identity Management framework 'WIF') and their relationship to security mechanisms and their approaches towards compartmented security within a Service Oriented Architecture (SOA). Specifically, an embodiment relates to a security framework that incorporates security mechanisms from the high assurance network, the defense network, and the third party framework. Additionally, other embodiments include additional augmentations necessary for a comprehensive SOA security framework.

As additional background, a discussion follows for each of these three systems (high assurance network, defense network, and third party framework). This includes an overview of each by detailing their concepts of operation, the security mechanisms that each employs, as well as, identifying any missing security mechanisms that can be perceived as being required for securing a Service Oriented Architecture (SOA).

A current compartmented high assurance information network is basically an eRoom based solution that loosely integrates a variety of collaborative capabilities into a single solution. The eRoom system provides a variety of collaboration capabilities that includes file sharing, chat, real-time white boarding, voice over IP, and a few others such as notes, calendars, and polls. In an embodiment, five distinct servers can be used—a web server, a database server, a real-time 'white-boarding' server, a voice conferencing server, and a file server.

The web server hosts the eRoom web application and some of the security customizations. The database server hosts a SQL database as the repository for usernames and passwords, and their access credentials or caveats, as well as, for storing both file and data link information. The real-time server hosts the white-board application, a conference server hosts the Voice over IP (VoIP) application and the file server stores all of the physical data files. In general, the security customizations prevent unauthorized user access, as well as, user/data compartmentalization. In other words, if a user is not in the database, that user cannot gain access to any data, and if the user is in the database, the user is granted access only to the eRooms to which the user is cleared and in which the user is a participant.

The concept of operation is that cleared users are placed into the database along with their login credentials and caveats. As part of an eRoom creation process, a coordinator assigns a security level and caveats to the eRoom and assigns users as participants. One of security customizations then checks all of the prospective users to make sure that their security level and caveats match those of the new eRoom. Once users are cleared as participants of an eRoom, they can create and share any the above mentioned items within that eRoom. For example, if a VoIP conference link and its associated password are present in the eRoom, by clicking on the link and entering the password, the user is entered into a unique/private VoIP conference available only to the participants of that eRoom.

In order for a high assurance network to be accredited, many different security mechanisms are included as 'defense in depth'. In addition to traditional network layer Type 1 and Type 2 VPN devices, security mechanisms as well as any infrastructure wide mechanisms can be applied as indicated in the chart below.

| Collaboration Function/ Security Mechanism | eRoom | Chat | VoIP | Email | White-Boarding |
|---|---|---|---|---|---|
| HTTPS: (SSL) | X | X | X | — | X |
| Entrust Profiles/Passwords | — | — | — | X | — |
| Domain Username/Password | X | — | X | — | — |
| PKI: Authentication | — | — | — | X | — |
| PKI: Encryption | — | — | — | X | — |
| Content Adjudication | — | — | — | X | — |
| Session Key (DES) | — | — | X | — | — |

What is notable in the above chart is that the eRoom implementation in the high assurance network system does not apply security in a consistent manner. For example, email which is a stand-alone application requires an Entrust login, whereas, the eRoom requires a request for domain level login. Once logged into eRoom, the user can access Chat and WhiteBoarding without being prompted for further credentials, which however is not the case for VoIP since each conference is password protected.

Although the high assurance network system provides domain level authentication using username and passwords as the primary eRoom security mechanism, the solution could incorporate multi-factor authentication as part of the main access control mechanism and apply security in a consistent manner.

In addition to the login inconsistencies, once a user is logged into eRoom and is participating in a chat room there are not any mechanisms for the encryption of classified chat messages destined to be posted by the chat service. And there certainly is not any content adjudication of the text message prior to it being posted to the chat room. The lack of message encryption could lead to a chat message being intercepted. Note that the use of VPN tunnels at least minimizes this threat to that of the user's local LAN or that of the high assurance network system servers LAN, both of which are secure areas. The lack of chat content adjudication could lead, not only chat room corruption, but also to unauthorized disclosure of classified information. Currently, only a user can prevent this from occurring.

Another problem with a high assurance network system is that the system utilizes a product specific database to hold a user account identity, associated Email address, and most importantly the user's associated caveats. This mechanism is solely based on user authentication. Specifically, the user enters his or her domain username and password (i.e., username 'JohnDoe'). Once authentication is successful, the high assurance network system looks up the user's email address associated with the user account (i.e., JohnDoe@somesiteABC.com). If 'JohnDoe' possess clearances or caveats A, B, C then the database will have a corresponding entry in the 'email_to_caveat' table that associates that user's email to each of the caveats. As a result of this fixed user email to caveats association, if the user were to travel to a different site that supported only caveats A and B and he logs in using his 'JohnDoe' credentials, the system would give him access to 'C' caveat data. This could lead to a variety of possible security violations. For example, if the user downloads a document containing a 'C' caveat it could contaminate the LAN, or if the user printed a document at that site it could lead to inadvertent disclosure of classified information to people who are cleared only for A, B. On the other hand, if the high assurance network system utilized both user and workstation authentication mechanisms, although the user is cleared A, B, C, the workstation would have been designated A, B only and the resulting adjudication would be the intersection of the user's and the workstation's caveats, in this case A,B,C ∩ A,B=A,B. This mechanism can be provided authoritatively with user to workstation binding (UTWB) discussed later in this specification.

A typical defense network (such as DISA's Network Centric Enterprise Services (NCES) mentioned above) includes a set of web services that implement security within a service oriented architecture. The core services include policy services, attributes services, credential management services, domain trust federation services, security context services, and auditing and logging services. The services are implemented using industry standard specifications for web service security such as WS-Security, SAML and XAML.

The following represents a general concept of operation. A user desires to utilize a pre-registered web service. As part of an outbound client request to the web service, a pre-loaded and configured message handler, intercepts and crafts an outgoing SOAP message that contains a SAML assertion which identifies the user, and what actions that the user is attempting to perform. The assertion must contain the user's Distinguished Name from the DoD PM issued X.509 certificate. The soap message must also contain a digital signature that has been created over not only the assertion itself but also parts of the SOAP message body in order to prevent replay attacks.

The request message is then released to the intended destination. Prior to reaching its destination however, the message is intercepted and processed by a Policy Enforcement Point (PEP). The PEP extracts the user's certificate and requests a certificate validation service to validate the certificate. The certificate validation service processing includes trust chain/issuer validation, expiration, and certificate revocation checks. Once verified, the PEP calls the user authentication service. The user authentication service reconstructs and verifies the user's signature against the original contained within the message. The user authentication service passes the user's request to the policy decision service which will authorize or deny the user's requested action. In order to do so, the policy decision service will query the attribute service to verify that the user is authorized either via role or group membership for the requested operation.

The defense network's primary security mechanisms are the usage of user based RSA Digital Signatures and encryption, sign SAML assertions, and certificate validation processing. The defense network utilizes attribute based policies to formulate authorization decisions. When looking at the defense network framework as a whole, the effort should be viewed as a major step in the right direction. However, with that having been said, there are a few issues that are not addressed when looked at from a compartmented networks perspective. These issues range from device and authentication issues to service related issues and are detailed below.

For device issues, although a common access card (CAC) can certainly be used by a user to log onto to an unclassified network such as the NIPRNET, the fact that the CAC has writable containers has previously prevented a CAC from being authorized for usage as credentials onto a secret network such as the SIPRNET. Although initially only the SPYRUS USB Token's have received the approval to be used on the SIPRNET, DISA has crafted additional guidelines for the implementation of a SIPRNET CAC. This is due largely because the DoD 'prohibited' USB security devices to do their security, thus most compartmented networks do not allow for USB based devices other than mice and keyboards.

For authentication issues, in a compartmented networks usage, not only should the user be authenticated, but so should the workstation from which the network is being accessed. In many compartmented networks the network operations center (NOC) is cleared to process at all levels of the compartmentalization and the nodes or sites normally contain only a subset of compartments. For example, if a NOC was cleared as A, B, C, and a NOC user receives an email with such markings, then the user went to a site that is cleared A and B only (not C) and the user accesses that email, the LAN could be contaminated if the message is saved or printed. User authentication only would not have handled this problem, and this indicates the need for a user to workstation binding mechanism that again will be discussed later in this specification.

A typical third party framework (such as Microsoft's 'WIF') is a .Net-based framework for creating a claims-based identity model for user authentication to applications. It introduces concepts of identities, claims, security tokens, issuing authorities, security token service (STS), and relaying parties.

As a basic overview, a relaying party (i.e., a web based application) would be configured to require users to present a security token. The configuration defines the claims that the security token must present and also points it to an authoritative security token service. When the user tries to navigate to the web application, the application detects that the user is not presenting a security token, and redirects the user to the security token service. The security token service authenticates the user via Kerberos or forms-based username and password authentication, and then builds the required claims into a signed security token. Then the security token service redirects the user and the security token back to the original relaying party or web application.

At the relaying party's web server, a module intercepts the security token and verifies the security token's signature as that of the application's pre-configured security token service provider, and makes the claims available to the web application through the user's claims-based identity. Simply put, such a third party's platform and .Net elements, along with the functionality of the module, can provide the commercial off the shelf (COTS) plumbing for a claims-based identity model that can be leveraged to build claims-aware applications.

Such a third party system can use a variety of .Net centric capabilities from domain or Kerberos authentication to forms-based authentication. WIF centralizes security through the use of the STS which issues digitally signed tokens. The counter part to the STS is the module which validates the security tokens in accordance with PM best practices and using WS standards. However, such third party systems, like the NCES defense systems, is a major step in the right direction. Again however, when viewed in the light of a compartmented network, it does have one relatively important issue. That issue is the inability to present PKI-based user to workstation binding claims from a web based client to the security token service that can be authenticated.

In order to help clarify this issue with respect to such a third party's claims-based identity model, it is noted that there are two kinds of clients—active and passive. Active clients, also known as smart or thick clients, have application code that runs on the client machine and which can be used to formulate requests and to call services to be authenticated. With an active client, anything that can be done in .Net is possible to be included in the application and therefore they do not present any significantly unique challenges to the developer that can't be solved with a little effort through code. Passive clients, also known as dumb or thin clients however, do not have application code that runs on the client machine. Rather, their code runs in a web service or on the web server. With this kind of limitation it is impossible to formulate a user to workstation binding that requires the access to the user's certificate store due to the fact that such third party's such as Microsoft places internet downloads into a 'Security Sandbox' in order to try to protect the user's machine from malicious code. For example, when working with passive clients, Microsoft only offers, forms authentication, or Kerberos \domain authentication. Although the later may be acceptable in a non-compartmented network, it is still weak at best and certainly not strong PKI-based authentication. Furthermore, and most importantly, is the need to be able to authenticate both user and location based claims that the users are presenting to the security token service as authentic claims. It is this fact that is therefore the driving factor in the need to provide a user to workstation binding as authenticable claims from a passive client to a STS. Consequently, an embodiment of the present disclosure addresses this issue.

Specifically, in an embodiment, it does not matter what collaborative applications are used. Every application applies security in a consistent manner each and every time that the application is invoked. In order to do this, there is a common security framework that provides all of the required security mechanisms.

As detailed below, a security framework is introduced. A core thrust of this security framework is the ability to provide the necessary security mechanisms to meet the challenges within compartmented networks as well as resolve each of the issues previously identified as discussed in each of the other frameworks. An important item is the concept known as user to workstation binding (UTWB), and a manner in which a passive client formulates and presents a user to workstation binding to the security token service (STS) that is the issuing authority and that can be authenticated.

The following chart details an overall desired security posture.

| Collaboration Function/<br>Security<br>Mechanism | File<br>Sharing | Chat | VoIP | Email | White-<br>Boarding |
|---|---|---|---|---|---|
| HTTPS: (SSL) | X | * | * | * | * |
| Entrust Profiles/Passwords | ** | ** | ** | ** | — |
| PKI: Encryption | X | X | X | X | X |

-continued

| Collaboration Function/ Security Mechanism | File Sharing | Chat | VoIP | Email | White-Boarding |
|---|---|---|---|---|---|
| Content Adjudication | X | X | X | X | — |
| Session Key (AES) | — | X | X | — | X |
| PKI: User to Workstation Binding | X | X | X | X | X |

\* Several of the applications have been changed from passive to active clients and no longer use SSL. However, both transport and message layer security mechanisms are available for these applications.
\*\* Entrust places a user's private key in the MS CAPI store.

The security framework facilitates IA through capabilities built into and using a service oriented architecture (SOA). The framework provides client applications with the ability to formulate a security binding that can be authenticated. Once authenticated, the binding information is used to determine an authoritative adjudication solution. The adjudication solution is then used by the application to control access to compartmented data.

The usage of the framework is integrated at the application layer. Typical target applications for integration and usage of the framework are those being deployed as collaborative tools like eRoom, WebTop, SharePoint, Email, Chat, VoIP and White-Boarding.

Although each application and its software development kit (SDK) may present unique challenges to the methods of integration and usage, the goal remains the same for all applications, which is to provide a means by which security can be applied in a reliable and constant manner. The framework can be divided into four distinct service areas. These four service areas are the Client Services, Web Services, Support Services, and Domain Services.

A web application like SharePoint (also known as a relaying party) is configured to require a security token, and it describes the claims that a security token is required to present. Configuration of the relaying party also points to a security token service that the application trusts. Given basic web form username and password, or Kerberos authentication, this functionality is available as COTS (commercial off the shelf) out of the box given some infrastructure configuration. However, when attempts are made to achieve the security posture as needed by a compartmented network, and there is a need to authenticate not only the user but also the workstation from which the user is accessing the application, this becomes more difficult due to the 'security sandboxing' mentioned earlier. With the limitation of 'security sandboxing' it is virtually impossible to formulate a user to workstation binding using the user's COTS configurations because it requires access privileges to the user's certificate store. Nonetheless, the security framework has incorporated a way to overcome this problem using a signed browser application.

The browser application is a digitally signed application that is configured to run as a trusted application. As part of the configuration process, the code signing certificate's public key is installed into what is known as the user's trusted publishers store. The browser application is embedded on a STS webpage. Each time a user is redirected to the STS web service, the browser application is downloaded into the user's temporary internet files, given the current revision is not already in the user's cache. The end result is that when the browser application is downloaded via the STS page, the application's digital signature is validated against the certificate in the user's trusted publisher store. This process allows for the browser application to bypass the inherent security sandboxing process, which subsequently gives the brower application the security privileges to access the user's certificate store and ultimately obtain handles to both of the user's and workstation's public and private keys. It is this ability which is vital to the formulation of a user to workstation binding as is next disclosed.

Central to either type of client (active or passive) is the ability to not only authenticate the user but also the workstation that they are using, in a manner that prevents spoofing either independently of each other, this is what is known as user to workstation binding (UTWB). In UTWB, data that is relevant to the workstation is gathered—the machine name, the domain name, the certificate's public key, and the data is combined with a date timestamp and a globally unique identifier (GUID), as a random number. This data is serialized into a SOAP message and a digital signature is formulated using the machine certificate's private key. A similar data gathering process is repeated for the user, that is, collecting the username, user certificate's public key, and the requesting application's name along with the same date timestamp and the same GUID. This user data is combined with the workstation data and the workstation signature, and this combination is serialized into a SOAP message and a digital signature is formulated using the user certificate's private key.

Users and Workstations are allowed to work with data based on their assigned clearances. Users are briefed based on their need to know for their assigned clearance and this grants them access to data at different levels known as a caveats. Workstations on the other are designated to operate a specific security levels or caveats based on the location of the LAN in which it is installed. The caveats of the user and the caveats workstation are not always the same. It is potential difference between the User's caveats and the Workstation caveats that is why the user needs to be bound to the workstation from which they are trying to gain access. In order to bind the user to the workstation both the user and the workstation must be issued digital certificates. Objects are created for the workstation and the user.

This methodology ensures that the user cannot be authenticated without the workstation data and the workstation signature, and allows for the workstation to be authenticated independently. Ultimately, it means that it can be proved who the user is and that the user is accessing the application from the only machine that has been issued the enclosed workstation certificate.

In a typical third party implementation (such as Microsoft's WIF), the security token services is an example of a web service, and in the defense system (e.g., NCES) this is the policy enforcement point or PEP. In either case, the web service within the context of the security framework is simply the visible or advertised interface. Within the context of the security framework this is an application for active clients or the security token service for passive clients.

A security token service is the issuing authority for security tokens. The security framework's STS controls the processing of security token requests and the building of the resulting security tokens typically for passive clients only. Again, given the need for the ability to authenticate both the user and the workstation, the security framework's security token requests need to support user to workstation binding. As mentioned above, the issue at hand however, is the inability of a web page to access the necessary security elements in order to obtain the appropriate handles of the user's and workstation's certificates public and private key pairs. In order to achieve this functionality with the security framework's STS, the browser application disclosed above is used. The security framework's STS will as a result of a successful authentication and adjudication process query a server and database for the results, and using these results, it will formulate and sign a security token and redirect the users with the resulting security token to the original requesting relaying party web page.

The queried server and database are unique in that they are the only service that performs a role in each the web service and support service categories. The role which it performs is related to the type of client that accesses it. In support of an active client it performs as a web service and in support of a passive client it performs a support role to the security framework STS. The queried server and database receive authentication requests and control the authentication process. In addition to the authentication process, the queried server and database also control and co-ordinate the security adjudications solution.

Interactions between the security framework's STS and the browser application begin as the relaying party is redirected to the security framework's STS. The security framework's STS generates a GUID each time that the security framework is loaded. The GUID serves as a unique authentication id. This GUID is passes to the browser application as a startup parameter in the form of a query string. Upon the browser application's activation, it parses the query string and extracts the GUID making it available to the user to workstation binding process where it is used not only as a random number for robust digital signature creation but also as an unique identifier for each authentication request. Following the completion of the UTWB formulation, all of the data is placed into a user to workstation authentication request and authenticated.

Several support services are used in the security framework. At a high level these services perform authentication, certification verification, attribute retrieval, content adjudication, session keying, and audit/record keeping. These functions are discussed in detail below.

An attribute service is the interface layer above a third party's (e.g., Microsoft) active directory's directory services. The attribute service receives attribute lookup requests that contain both the workstation and user domain names. The attribute service locates and builds a directory entry object for each caveat found in the appropriate caveat OU, which in some deployments will be defined not only at a site level but also at a LAN level if the site supports multiple LANs at different compartments. For each caveat found, the workstation and user are checked to see if they are both members. If both are members, that caveat is a common caveat and it is added to the resulting caveat string. This process continues until all caveats are examined and then the results are returned along with the security level and or any other required attribute such as the user's role.

A database service receives authentication events to be recorded in the database. The GUID of the original request is used as the key index and data such as the user, workstation, the security level, and the common caveats as well as a pass/fail indication that is written in an events table. The database service also receives queries against the authentication results stored in the events table and auditing functions. The security framework STS uses the results to build the security token being returned to a relaying party, and auditing functions that will display results to security officers. All of the data associated with an event entry for the requested GUID will be returned to the framework's STS. The database service also has an audit table that any component of the security framework can write to by calling the audit interface passing in a data string and a level of information, a warning, or an error.

A certificate validation (CV) service contains a single interface function 'verify'. This function can take certificate parameters for a workstation, a user, or both. Upon receiving a verify request, the service will check the certificate(s) for expiration, for validity of the issuer against the expected issuer, and verify that the certificate is not present on a certificate revocation list (CRL). The CV service will log all failures by calling the database service audit interface and passing the appropriate certificate information, domain name, serial number, and the reason for the failure along with an error status.

An adjudication service can support the adjudication of chat messages, email messages, document content, and VoIP content. Its support of chat messages is discussed in detail. The adjudication service contains one interface that can be referred to as an Adjudicate. The Adjudicate interface takes a message adjudication request from a chat program. The request is in the form of xml, and it contains a caveat string that represents the level of the chat room that the message will be posted. It also contains the text string to be adjudicated, a GUID and a signature by the chat service if necessary. In general, the concept of chat adjudication is relatively simple. If a user is posting a message in a chat room containing caveats A and B, then the message may contain any of the key words that are contained in the A and/or B key word lists. However, any other key words for any other caveats defined in the system results in a message rejection. The adjudication service audits the violation in detail. However, the error message sent back to the user should be generic, such as a 'Content Violation' message, so not to divulge the key word of the caveat that the user may not possess.

A key service provides a session key mechanism for any application that requires one. A chat room for example can be keyed using a unique session key, and in a VoIP session, each phone call would get a unique key. The session keys can be encrypted and disseminated securely using RSA techniques.

A domain service includes an active directory and public key infrastructures. The active directory provides a repository capability for storing domain level user and workstation memberships, as well as, all important user and workstation caveat memberships. The public key infrastructure provides the certificate authority to issue certificates and certificate revocation lists necessary for certificate verification. The issued certificate may or may not be stored with the active directory depending on the implementation.

A directory service controls access to the active directory membership information defined above. The directory service is a programmatic method of reading and writing data to or from the active directory. The directory needs contain a list of caveats. Additionally each user and workstation is placed as members of each caveat that they are authorized. Additionally extended attributes include the user's security clearance level and roles for which the user may perform his or her duties.

Each of the above-discussed services may be configured to use digital signatures and encryption depending on the location of the trust boundary. Performance may also come into play, as the number of services being visited in order to complete an operation increases the number of signature creations and verifications as well as the number of encryptions and decryptions.

Figure 2:
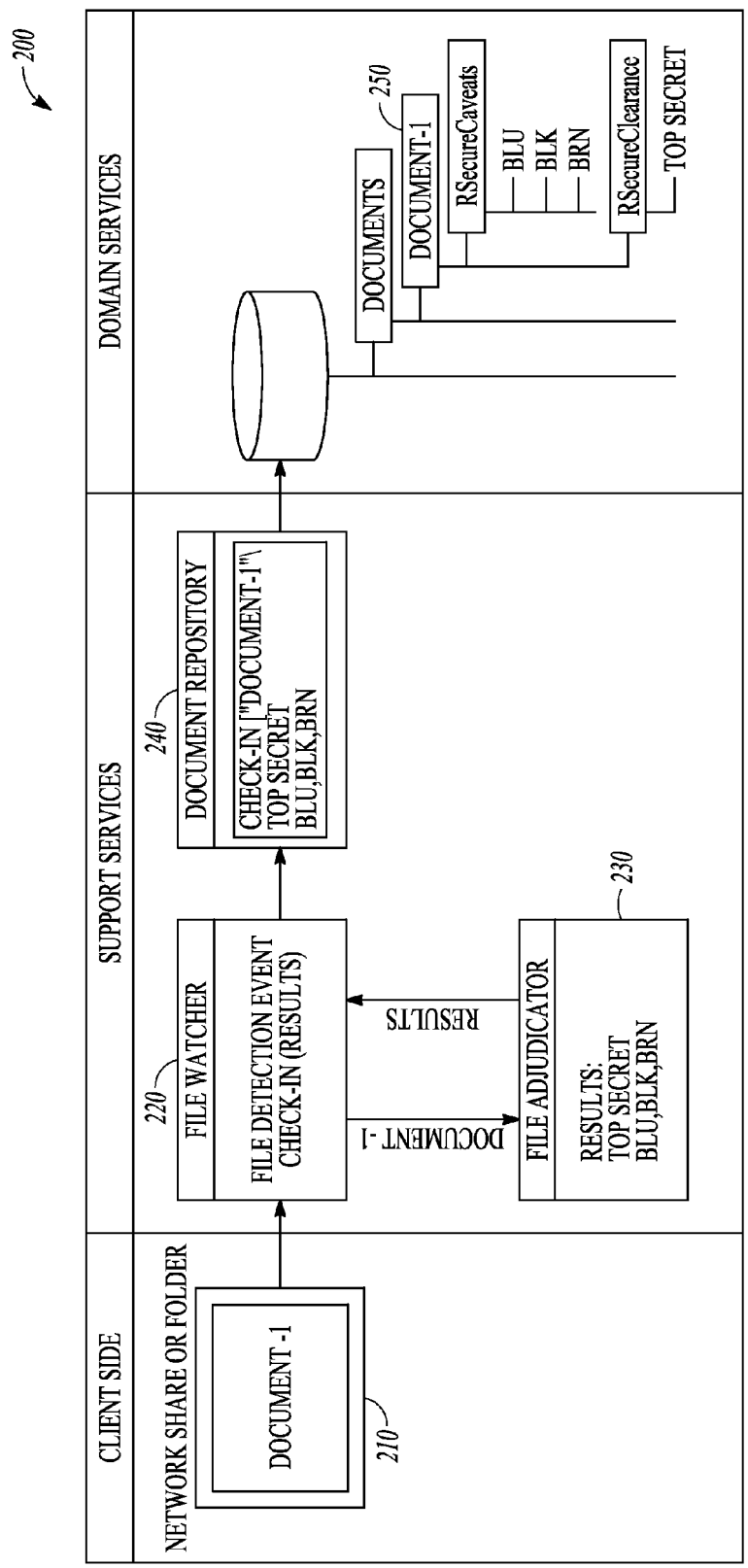
Figure 3:
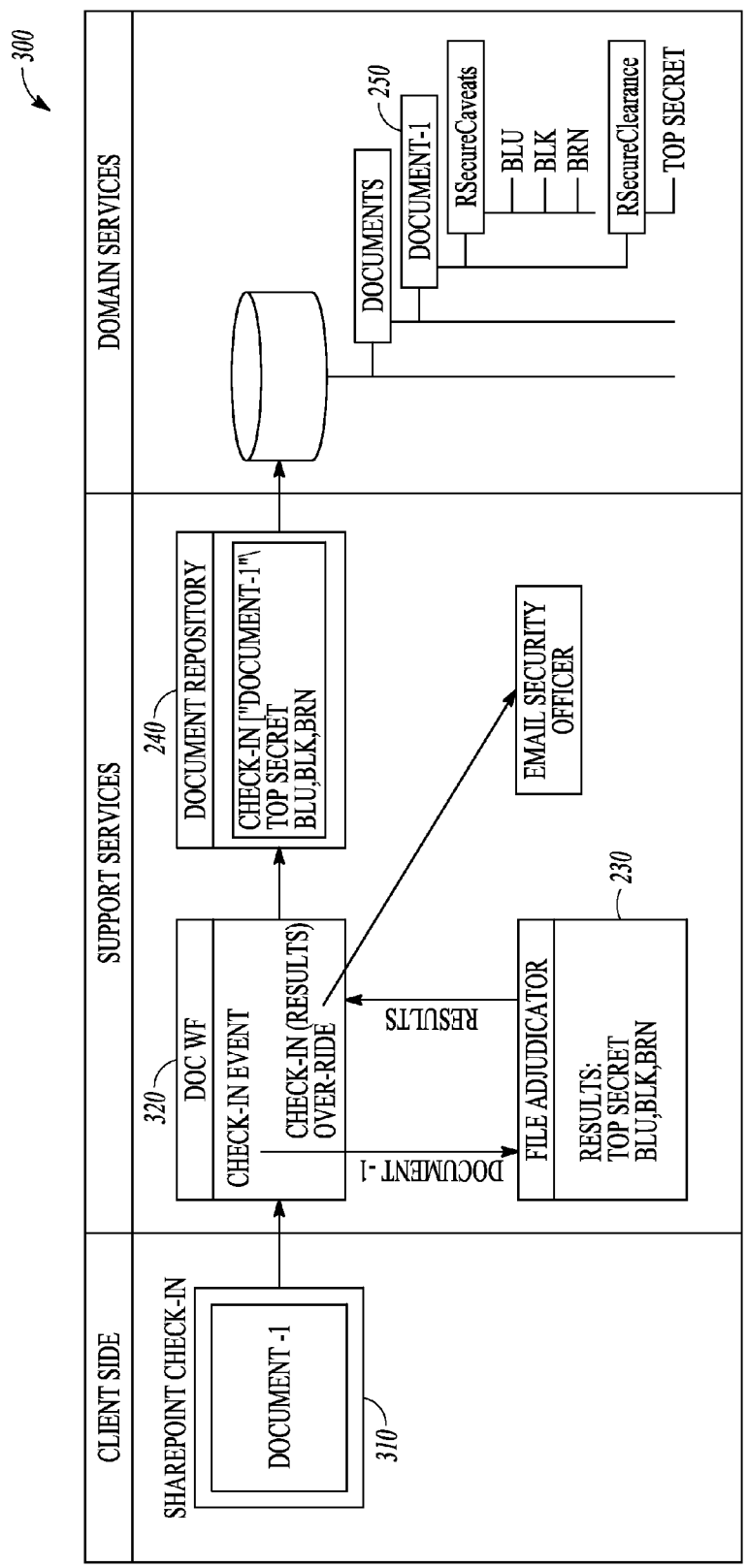
FIG. 3 is a block diagram of an automated adjudicated document check in on a SharePoint® system.

An embodiment of a claims-based, location-aware file, compartmented and adjudicated file sharing system is illustrated in FIGS. 1, 2, 3, 4, 15A, 15B and 15C. At 1505, a computer processor is configured to receive a request from a user to store a document in a database. FIG. 2 illustrates at 210 the document being dropped into a folder share, and a file watcher 220 detecting the folder share event. FIG. 3 indicates a similar process in a SharePoint document check in wherein a SharePoint check in request at 310 causes a check in event at 320.

At 1510, the computer processor receives a user security token. FIG. 1 illustrates a Security Token System 100 that retrieves a security token for a user. A client device 110 transmits a request to a server 130, and the request is redirected to a browser workstation 120. The browser workstation 120 sends a request to a server 140, which transmits a request to a domain service that includes a directory domain controller 150, which includes user security information 160 and workstation device information 170. A user security token is construction from the user security information 160 and the device security information 170. The token claims in 130 indicate Top Secret and BLU, BLK, BRN, which are simply generic examples. In an embodiment, the token claims could relate to Top Secret and Project A, Project B, and Project C.

At 1515, the computer processor receives a user security token that was generated by the STS 100 as illustrated in FIG. 1. At 1520, the computer processor analyzes the document to determine an adjudicated security level for the document. This is further illustrated in FIGS. 2 and 3 at 230. At 1525, the computer processor compares the user security token to the adjudicated security level. At 1530, the computer processor stores the document in the database when the user security token is equal to the adjudicated security level (FIGS. 2, 3, Nos. 240, 250). At 1535, when the user security token is not equal to the adjudicated security level, the computer processor queries the user as to whether the document should be stored in the database with the adjudicated security level. At 1540, the computer processor receives a response to the query from the user. At 1545, the computer processor stores the document in the database when the user agrees to store the document in the database with the adjudicated security level. At 1550, when the user does not agree to store the document in the database with the adjudicated security level, the computer processor transmits a message to a security officer and quarantines the document.

At 1552, the computer processor is configured to check for the user security token in the request to store the document in the database. When the request to store the document in the database does not include a user security token, the computer processor is configured to generate a user security token. The computer program generates the user security token as illustrated in FIG. 1. At 1554, the computer processor is configured to automatically generate the user security token when the user logs on to the system. At 1556, the user security token and the adjudicated security level comprise a first portion relating to a security clearance and a second portion relating to a security caveat. At 1558, the security clearance comprises one or more of unclassified, confidential, secret, or top secret, and the security caveat comprises a particular topic. For example, a particular topic may relate to a certain missile system, and a particular person may or may not have the clearance level to be apprised of information relating to that particular missile system.

At 1560, the user security token comprises a first portion relating to a user security clearance and a second portion relating to a device security clearance. As noted above, the user security clearance dictates at what security level a user can store a document and what documents a user can retrieve, and the device security clearance determines at what device a user can store a document and from what device a user can retrieve a document. At 1562, the user security token or the adjudicated security level for the document is stored as metadata associated with the document.

At 1564, the computer processor is configured to store the document at the security token level or the adjudicated security level as a function of a decision by the security officer. At 1566, the analyzing by the computer processor comprises scanning the document for an appearance of one or more keywords, each of the one or more keywords associated with a particular security level. In the security context, the keywords are commonly referred to as dirty words, as such words indicate the security level of a document and further indicate that particular users are not cleared to view such documents.

At 1568, the user security token is generated by a union of a user security clearance and a device security clearance. The union includes a least security clearance between the user and the device. That is, if the user has a top secret security clearance, but the device only has a secret security clearance, the user cannot view top secret documents on that device.

At 1570, the computer processor is configured to generate a workflow process when the user does not agree to store the document in the database with the adjudicated security level. At 1572, the workflow process is provided to the security officer.

Figure 4:
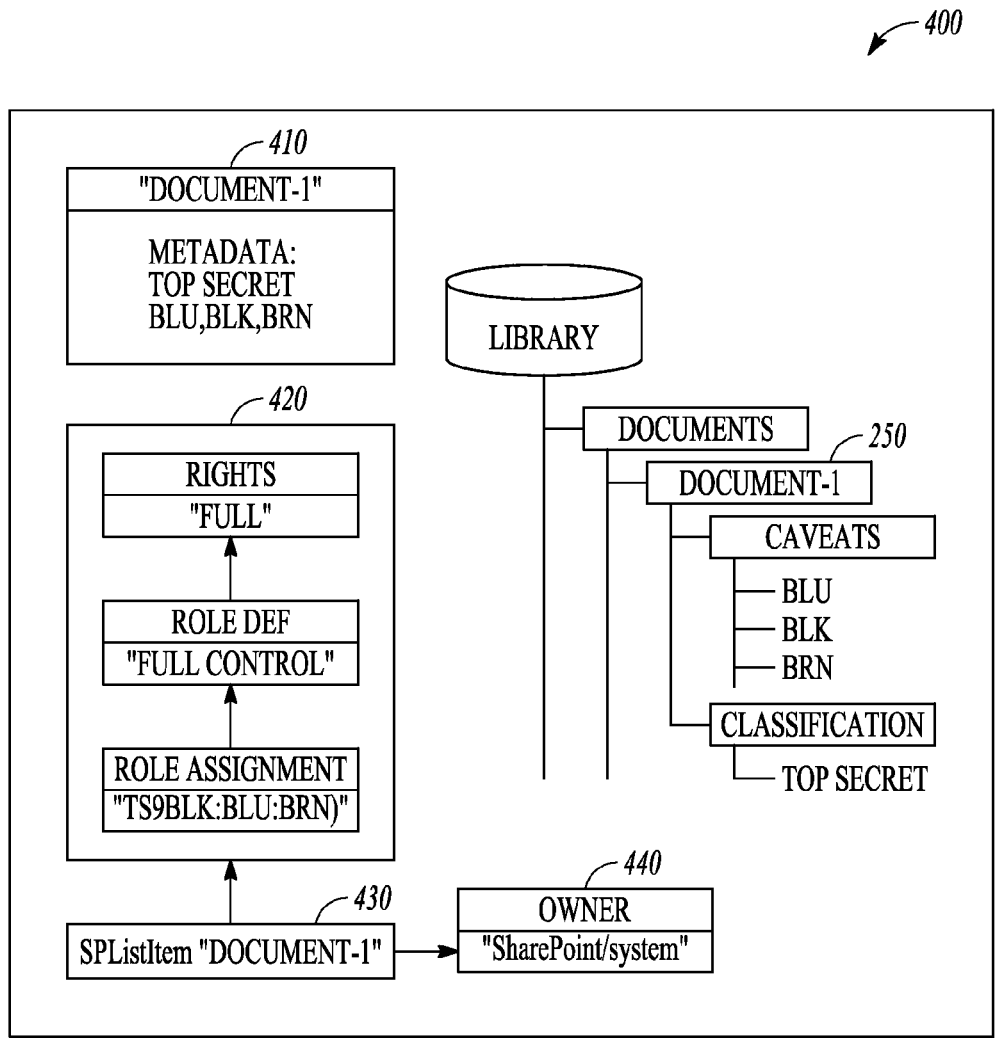
FIG. 4 is a block diagram of an Event Receiver on a SharePoint® system.

At 1574, the computer processor generates the user security token by compiling a user security clearance, one or more user security caveats, a device security clearance, and one or more device caveats into a group. At 1576, the computer processor transfers ownership of the document from the user to the security officer. At 1578, the computer processor is part of a SharePoint® system. The transfer of document ownership in a Sharepoint® system is illustrated in FIG. 4, wherein the system "listens" at 430 for a document 410. At 420, the system examines the rights, role definition, and role assignment for the documents, and further examines the owner of the document. As noted above, the ownership of the document may be transferred from the owner to the security officer.

At 1580, the computer processor is configured to monitor a document folder or a network filing sharing system (SharePoint®) to identify a document check-in request, and to invoke the analysis and adjudication upon the identification of the check-in request.

At 1582, the computer processor is configured to receive a request from a second user to access the document stored in the database. At 1584, the computer processor is configured to receive a second user security token. At 1586, the computer processor is configured to compare the second user security token with the security level of the stored document, and at 1588, when the second user security token is greater than or equal to the security level of the stored document, the computer processor is configured to permit the second user to access the stored document.

At 1590, the computer processor comprises one or more of a hosting processor for a file management system, a directory domain controller, and a security processor in communication with the directory domain controller. At 1592, the security processor is configured to acquire security token information from the directory domain controller, and the security processor is configured to transmit the security token to the hosting processor. At 1594, the device security clearance comprises one or more of an Internet Protocol address, a public security key, and a private security key.

Figure 5:
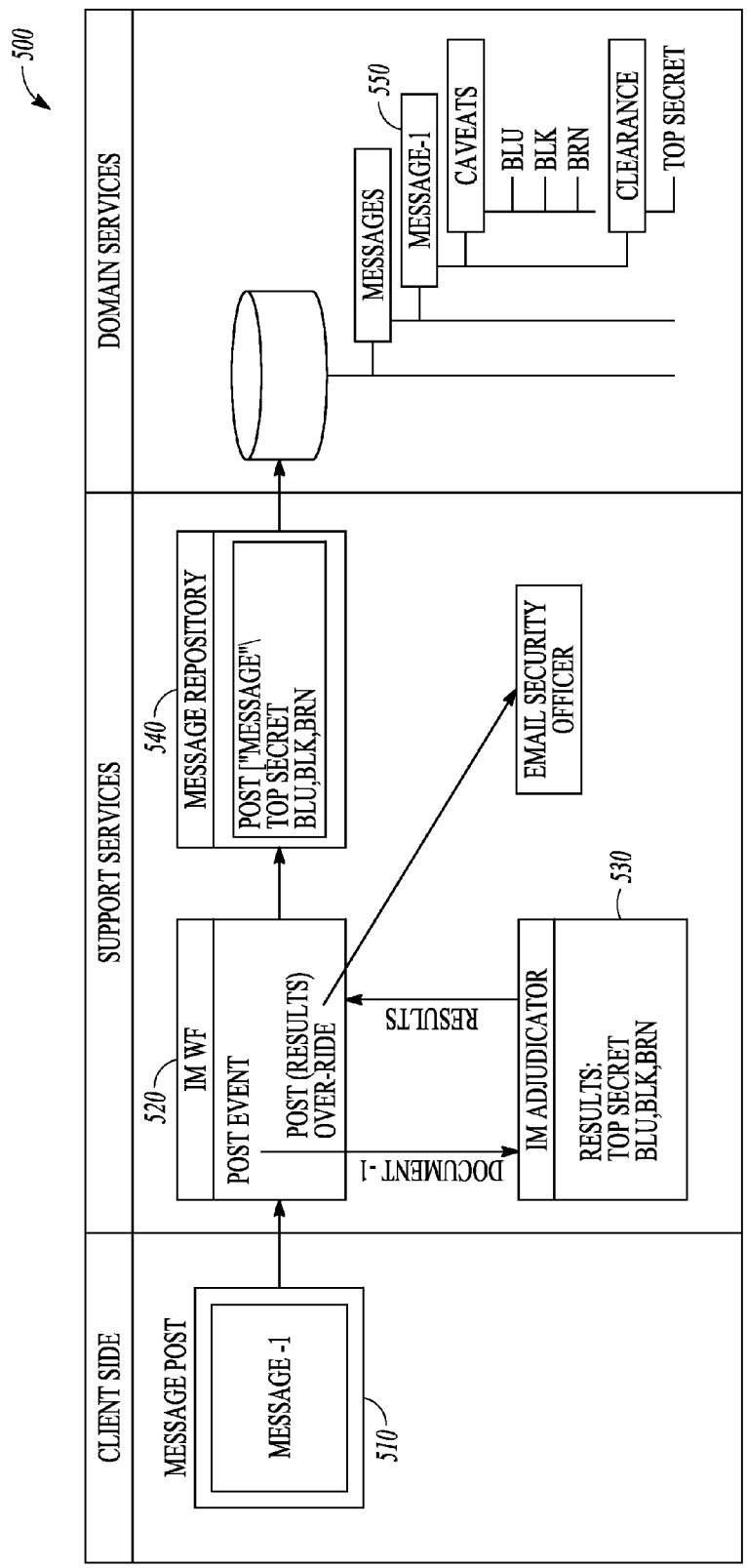
FIG. 5 is a block diagram of a message adjudication process.
Figure 6:
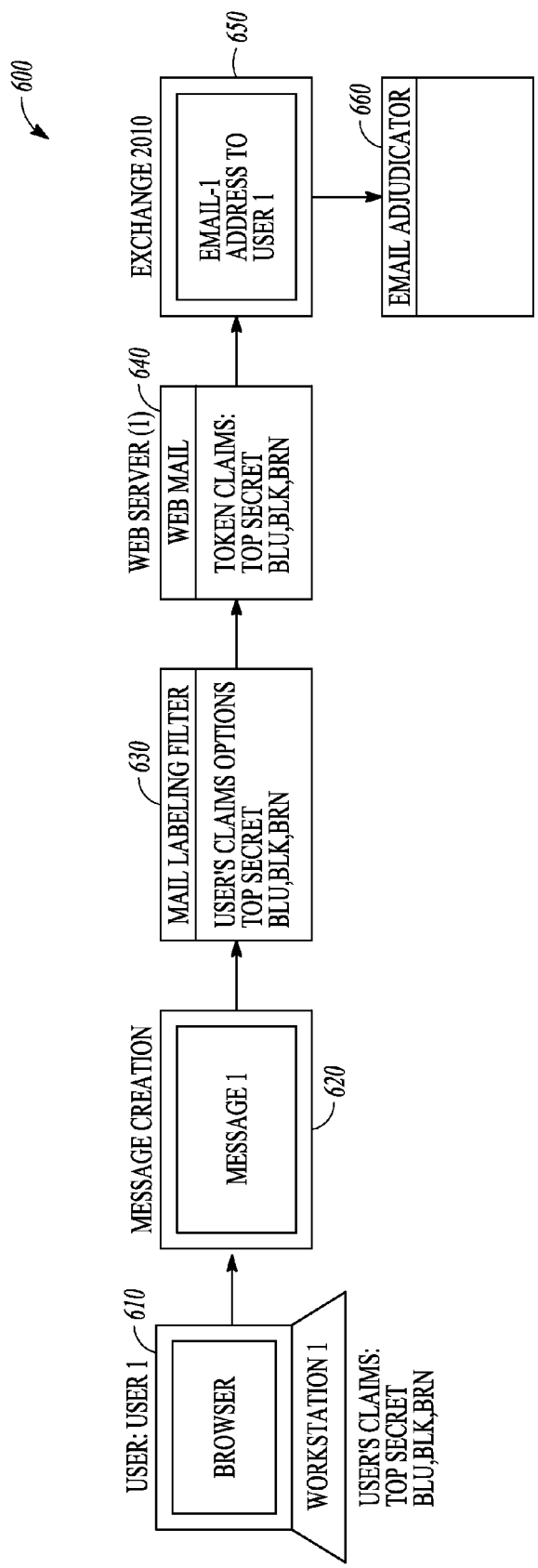
FIG. 6 is a block diagram of an email labeling filter.
Figure 16A:
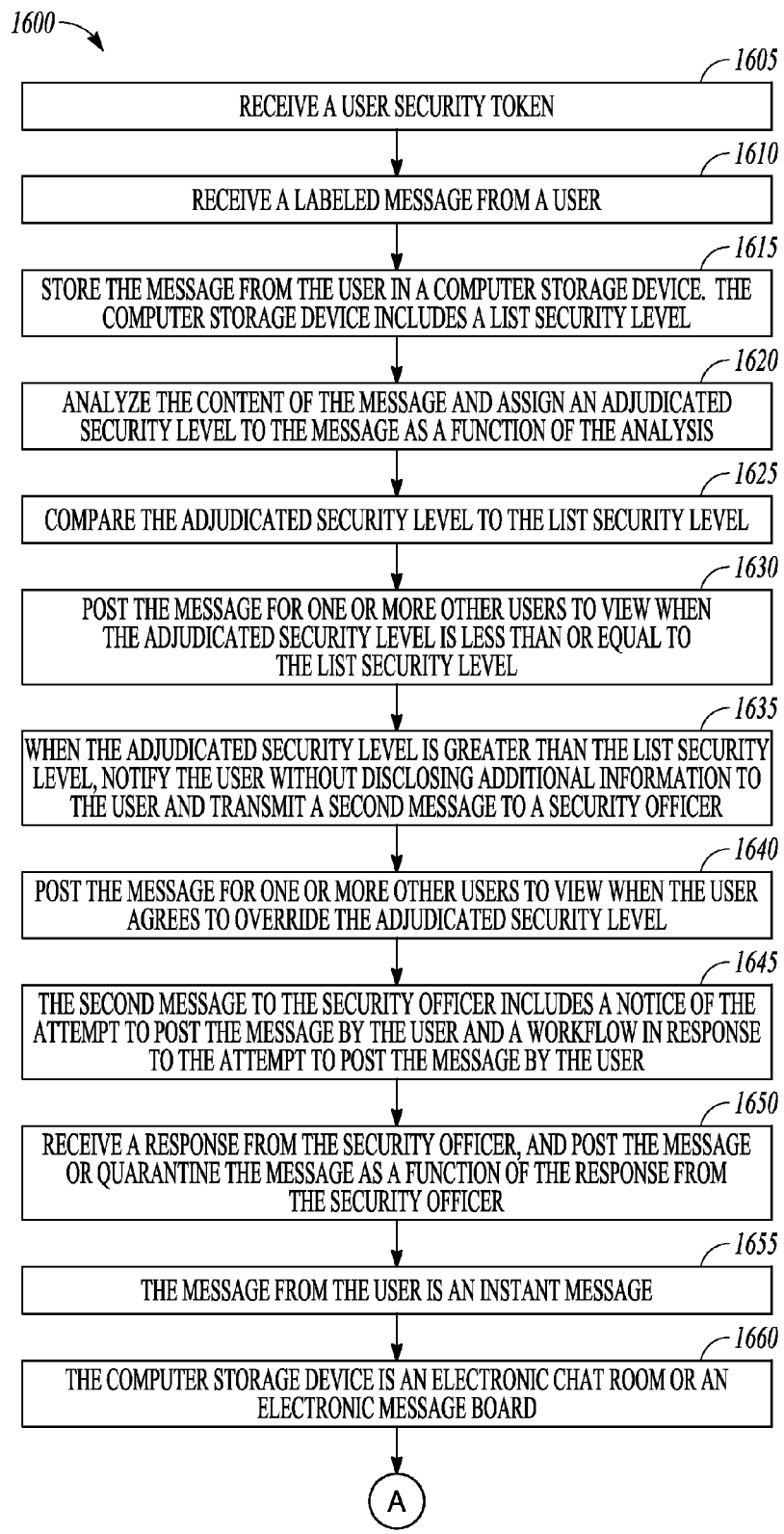
FIGS. 16A and 16B are a flowchart-like block diagram illustrating process steps and features of a claims-based, location-aware, compartmented, and adjudicated messaging system.
Figure 16B:
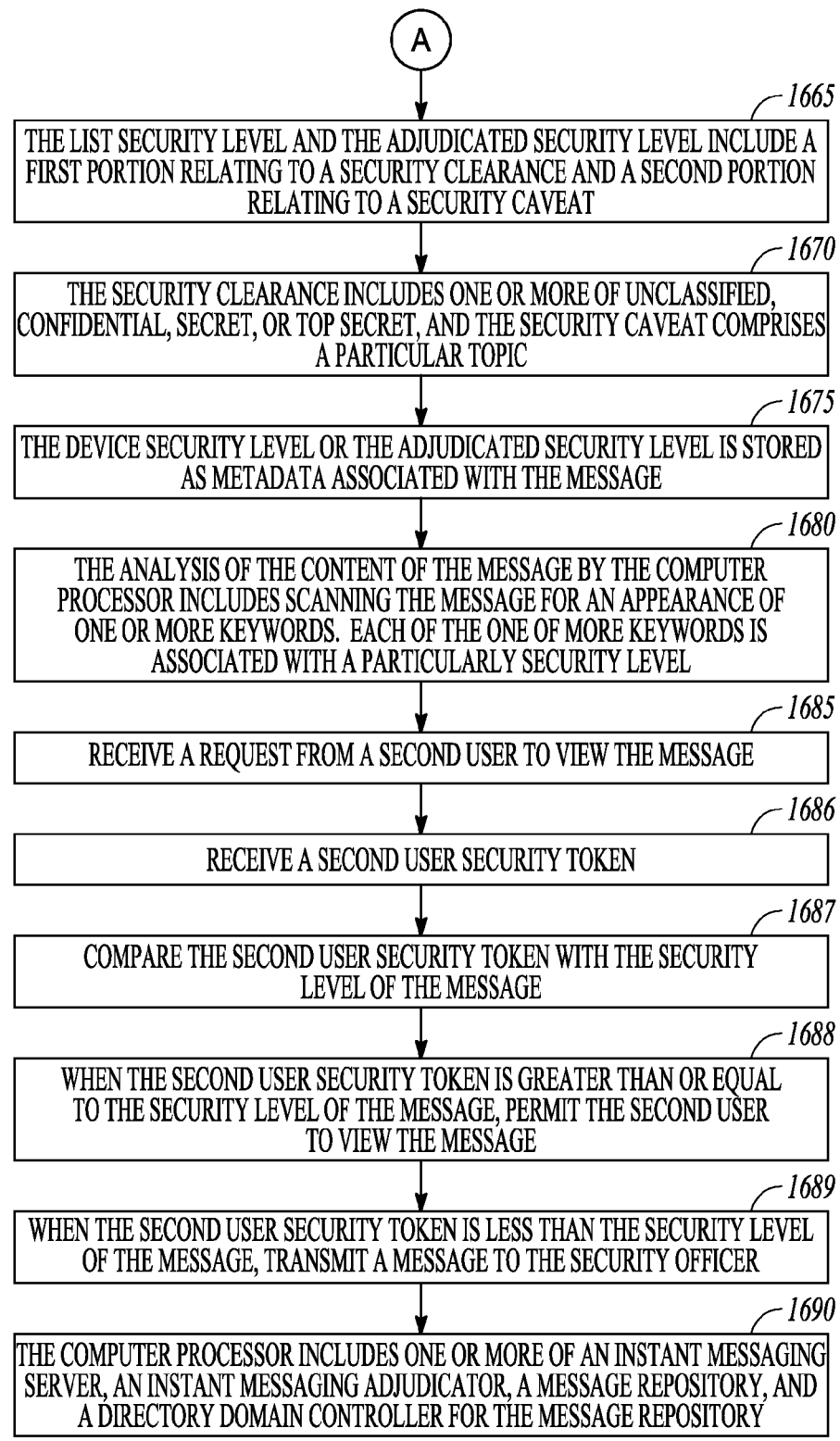
Figure 17A:
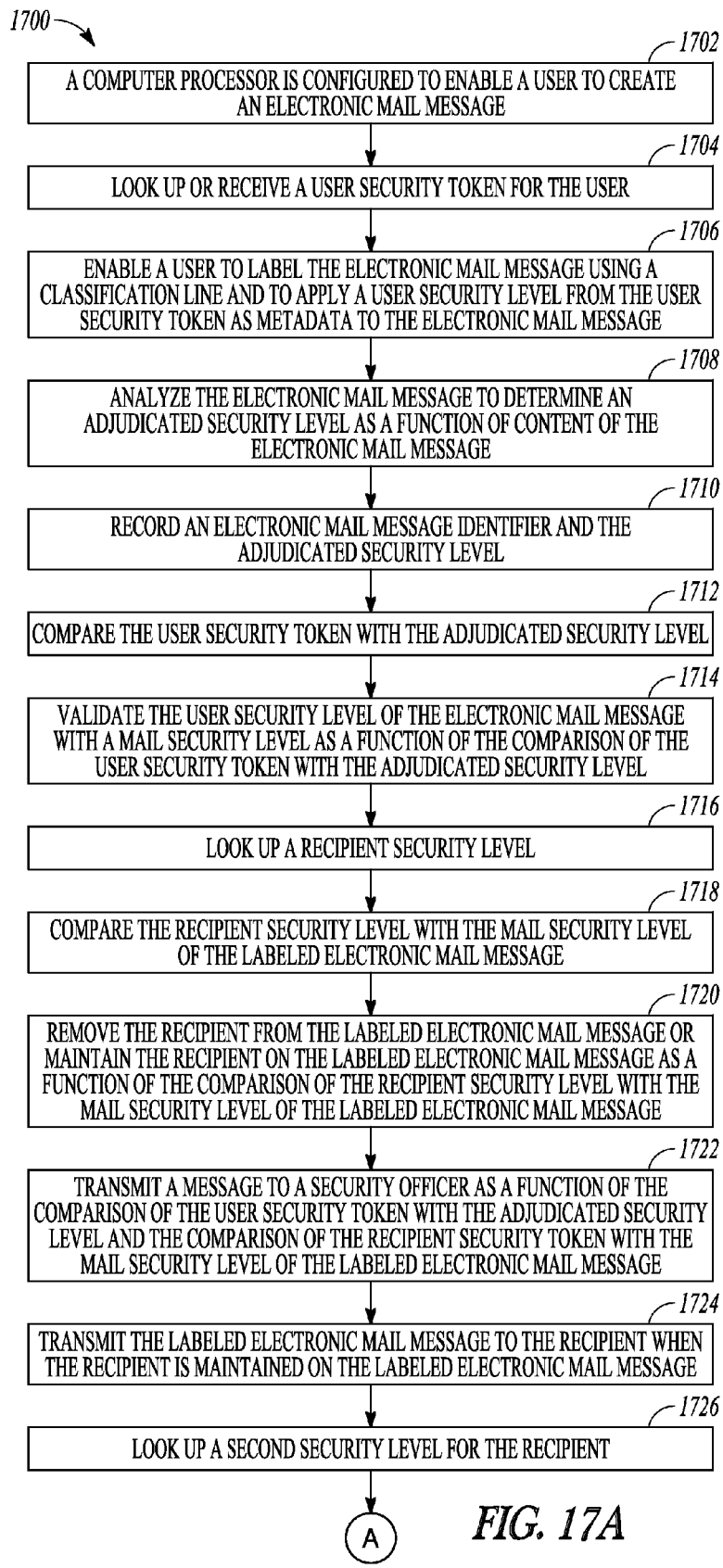
FIGS. 17A, 17B, and 17C are a flowchart-like block diagram illustrating process steps and features of a claims-based, location-aware, compartmented, and adjudicated electronic mail system.
Figure 17B:
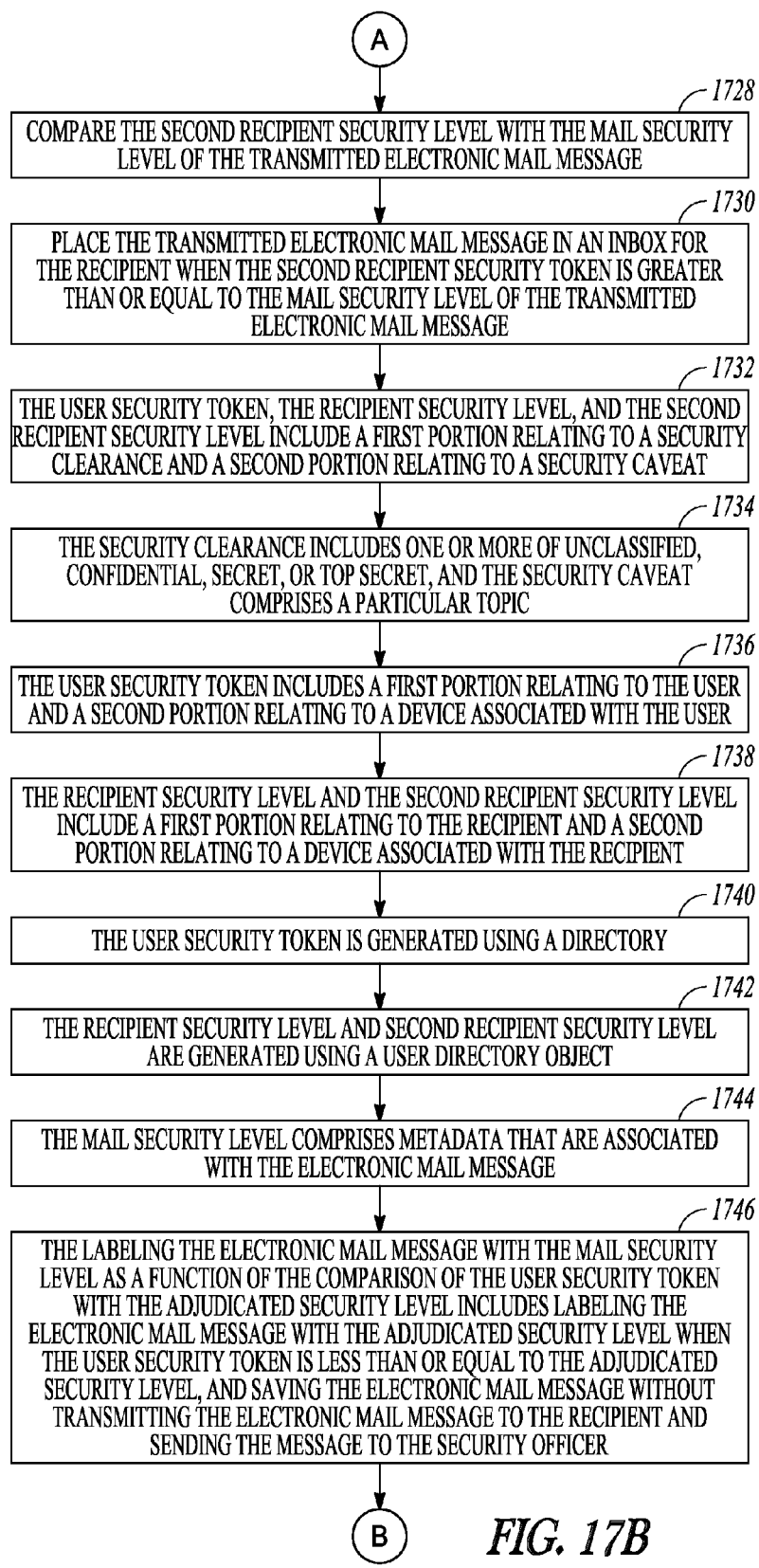
Figure 17C:
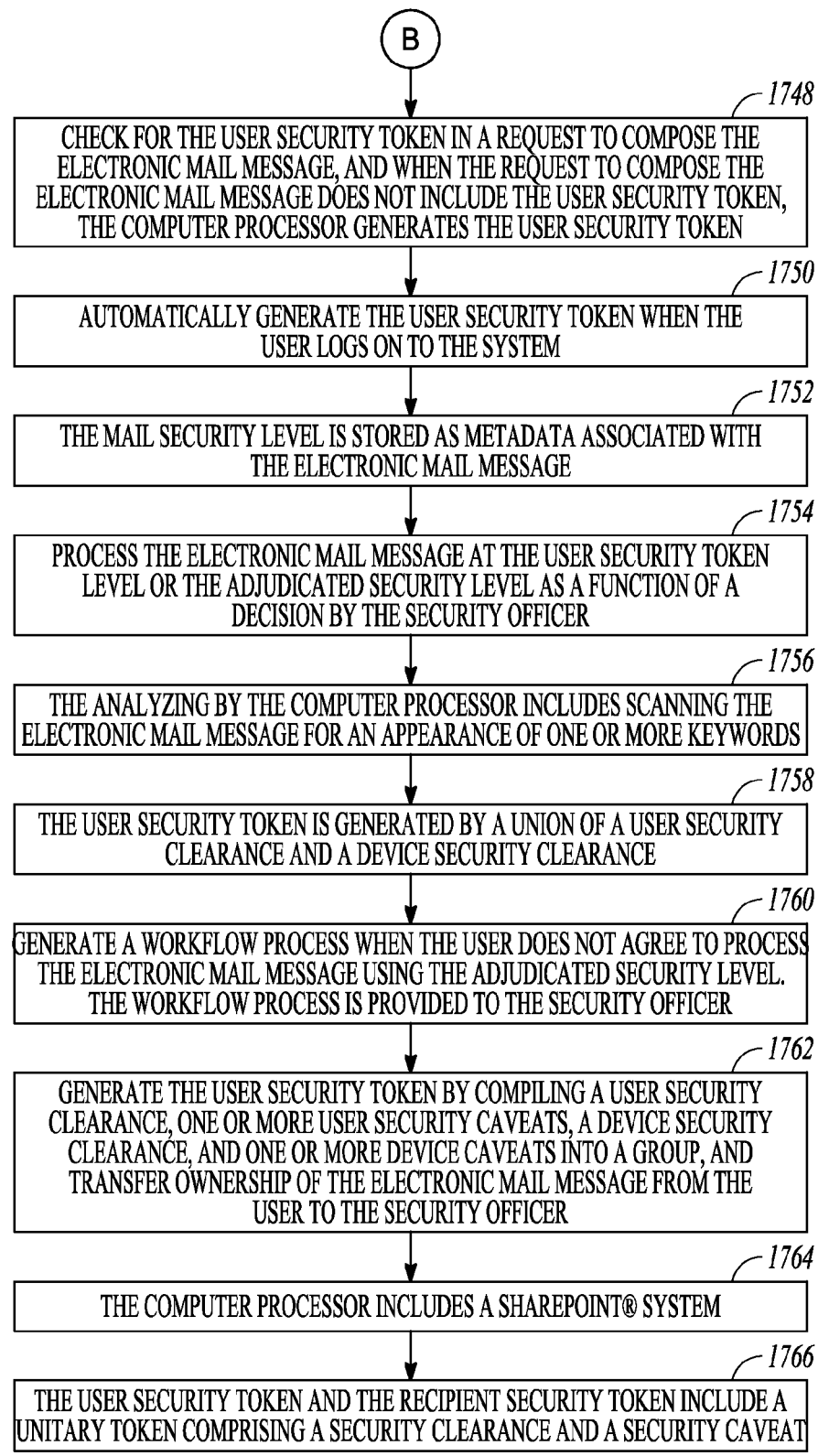

FIGS. 5, 16A, and 16B illustrate an embodiment of a claims-based, location-aware, compartmented, and adjudicated instant messaging system. At 1605, a computer processor is configured to receive a user security token. At 1610, the computer processor receives a labeled message from a user (FIG. 5, No. 510). At 1615, the computer processor stores the message from the user in a computer storage device. The computer storage device includes a list security level. At 1620, the computer processor analyzes the content of the message and assigns an adjudicated security level to the message as a function of the analysis (FIG. 5, No. 530). At 1625, the computer processor compares the adjudicated security level to the list security level. At 1630, the computer processor posts the message for one or more other users to view when the adjudicated security level is less than or equal to the list security level (FIG. 5, Nos. 540, 550). At 1635, when the adjudicated security level is greater than the list security level, the computer processor notifies the user without disclosing additional information to the user and transmits a second message to a security officer.

At 1640, the computer processor posts the message for one or more other users to view when the user agrees to override the adjudicated security level. At 1645, the second message to the security officer includes a notice of the attempt to post the message by the user and a workflow in response to the attempt to post the message by the user.

At 1650, the computer processor receives a response from the security officer, and posts the message or quarantines the message as a function of the response from the security officer.

At 1655, the message from the user is an instant message. At 1660, the computer storage device is an electronic chat room or an electronic message board. At 1665, the list security level and the adjudicated security level include a first portion relating to a security clearance and a second portion relating to a security caveat. At 1670, the security clearance includes one or more of unclassified, confidential, secret, or top secret, and the security caveat comprises a particular topic. At 1675, the device security level or the adjudicated security level is stored as metadata associated with the message. At 1680, the analysis of the content of the message by the computer processor includes scanning the message for an appearance of one or more keywords. Each of the one of more keywords is associated with a particularly security level.

At 1685, the computer processor receives a request from a second user to view the message. At 1686, the computer processor receives a second user security token. At 1687, the computer processor compares the second user security token with the security level of the message. At 1688, when the second user security token is greater than or equal to the security level of the message, the computer processor permits the second user to view the message. At 1689, when the second user security token is less than the security level of the message, the computer processor transmits a message to the security officer.

At 1690, the computer processor includes one or more of an instant messaging server, an instant messaging adjudicator, a message repository, and a directory domain controller for the message repository.

Figure 7:
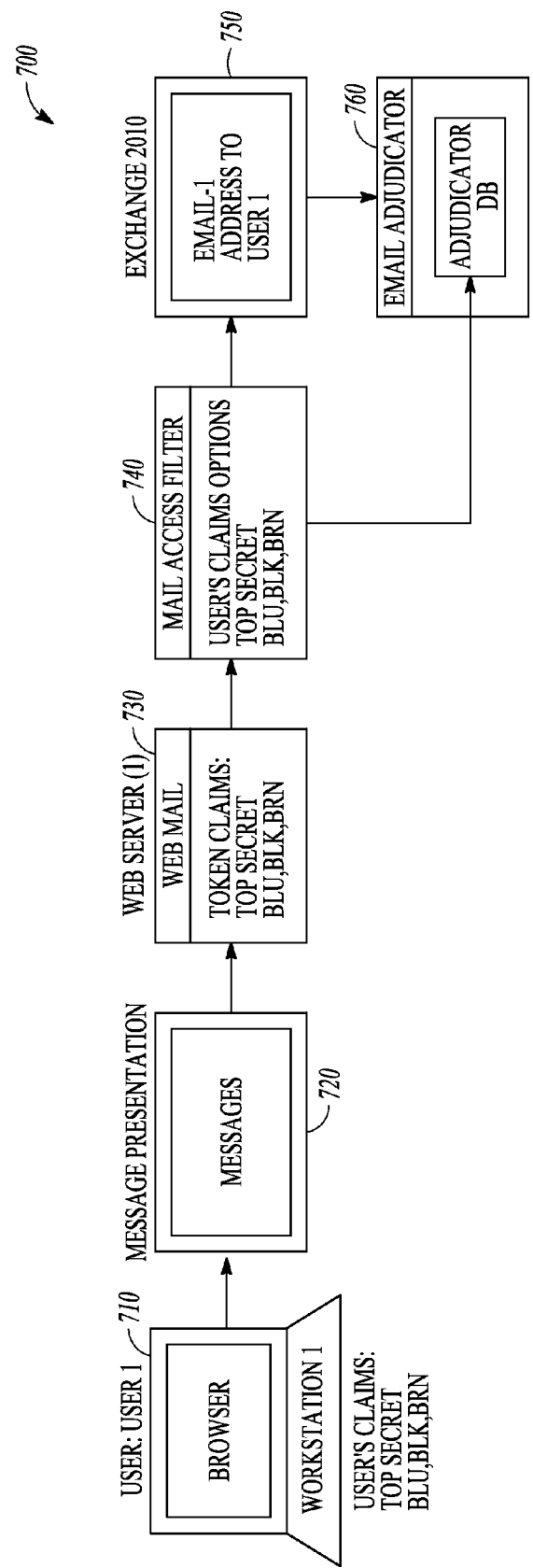
FIG. 7 is a block diagram of an email access filter.
Figure 8:
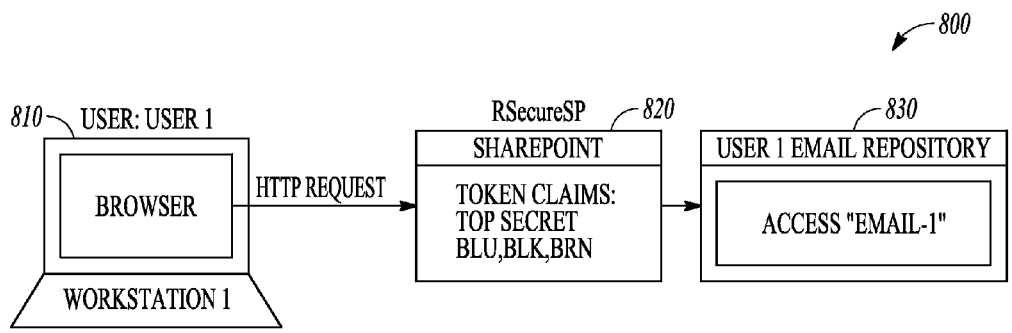
FIG. 8 is a block diagram of an email access process.
Figure 9:
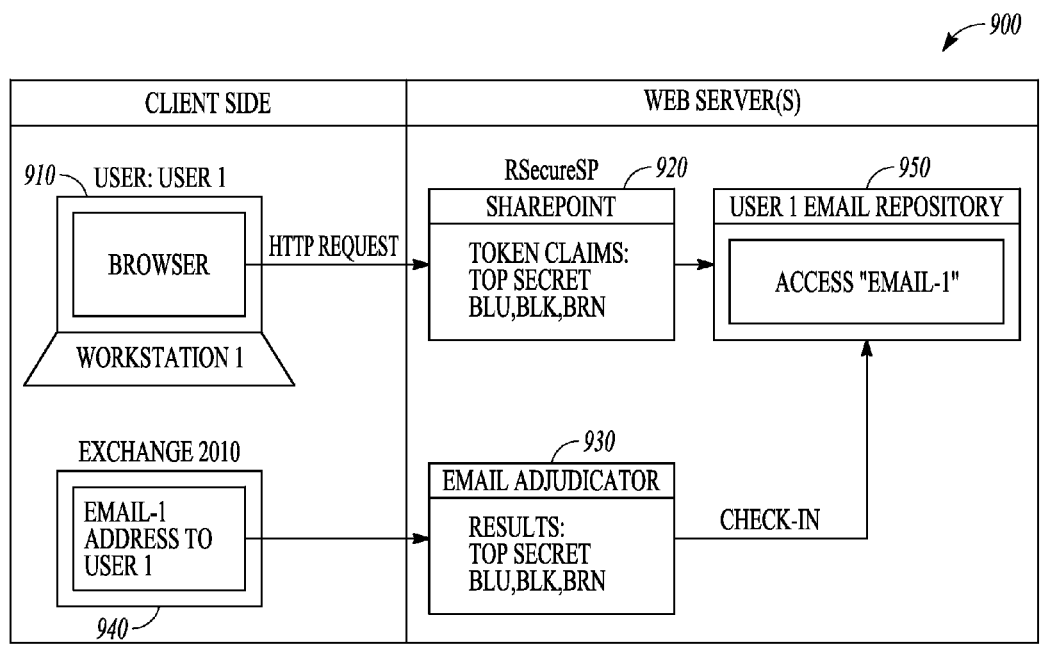
FIG. 9 is a block diagram of inbound adjudicated email on a SharePoint® system.
Figure 10:
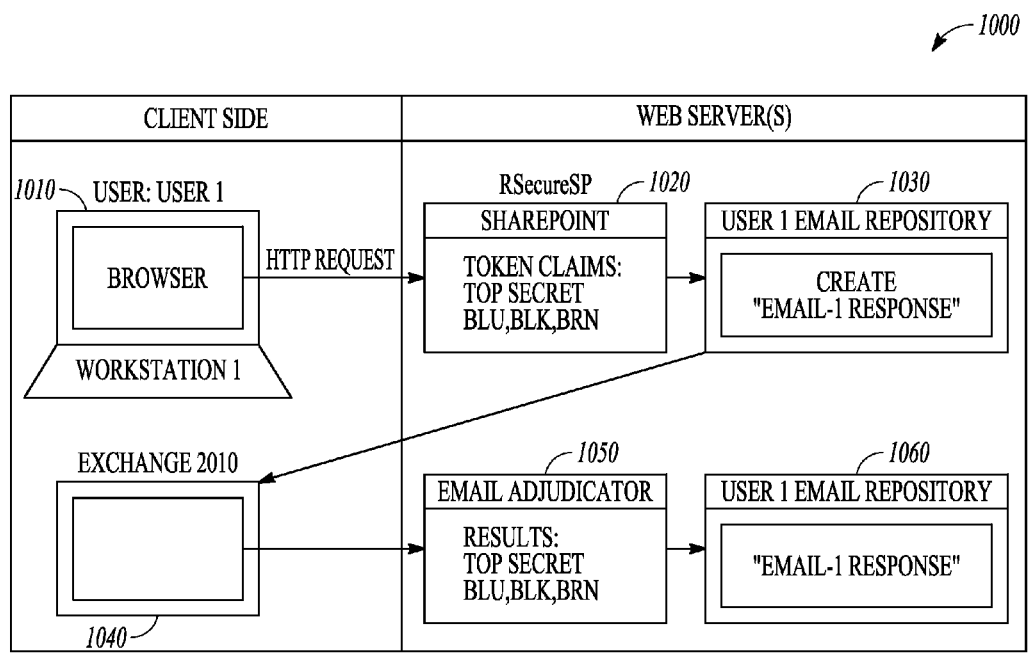
FIG. 10 is a block diagram of outbound adjudicated email on a SharePoint® system.
Figure 11:
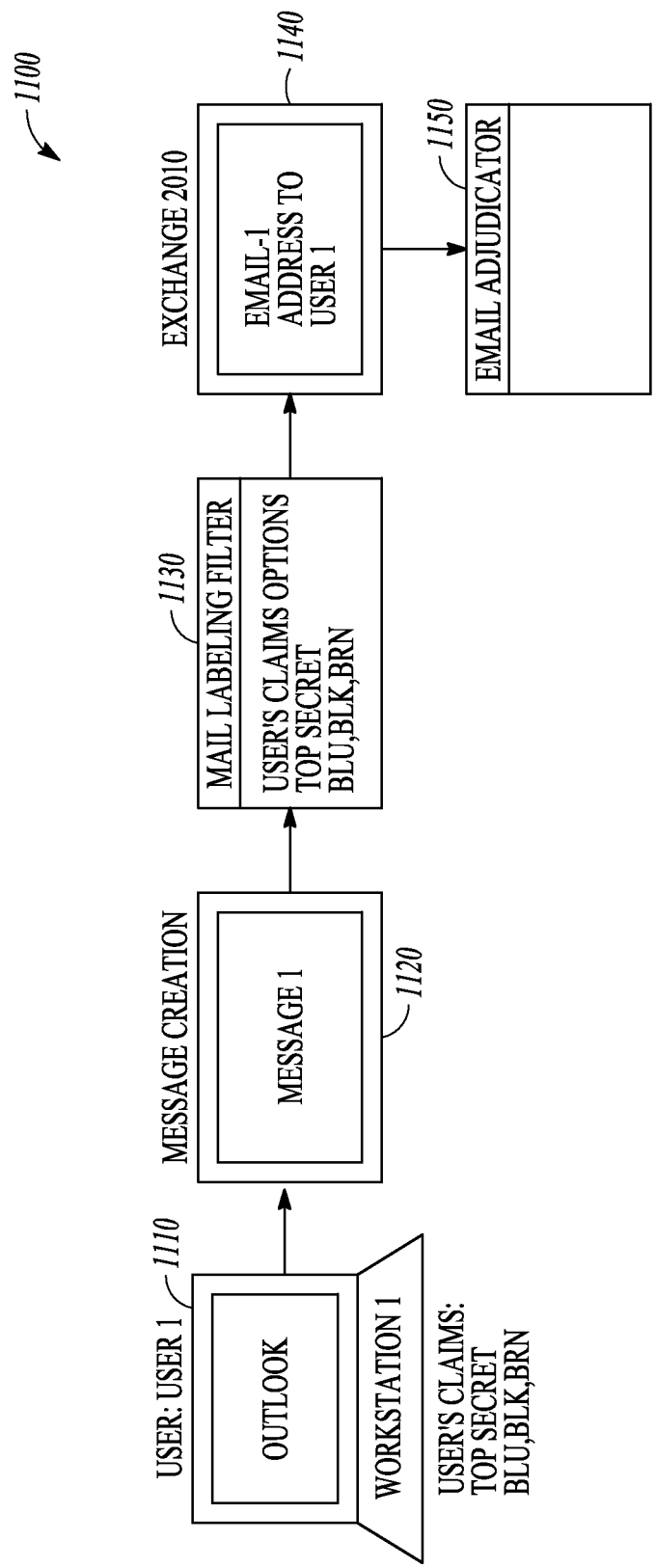
FIG. 11 is a block diagram of another email labeling filter.
Figure 12:
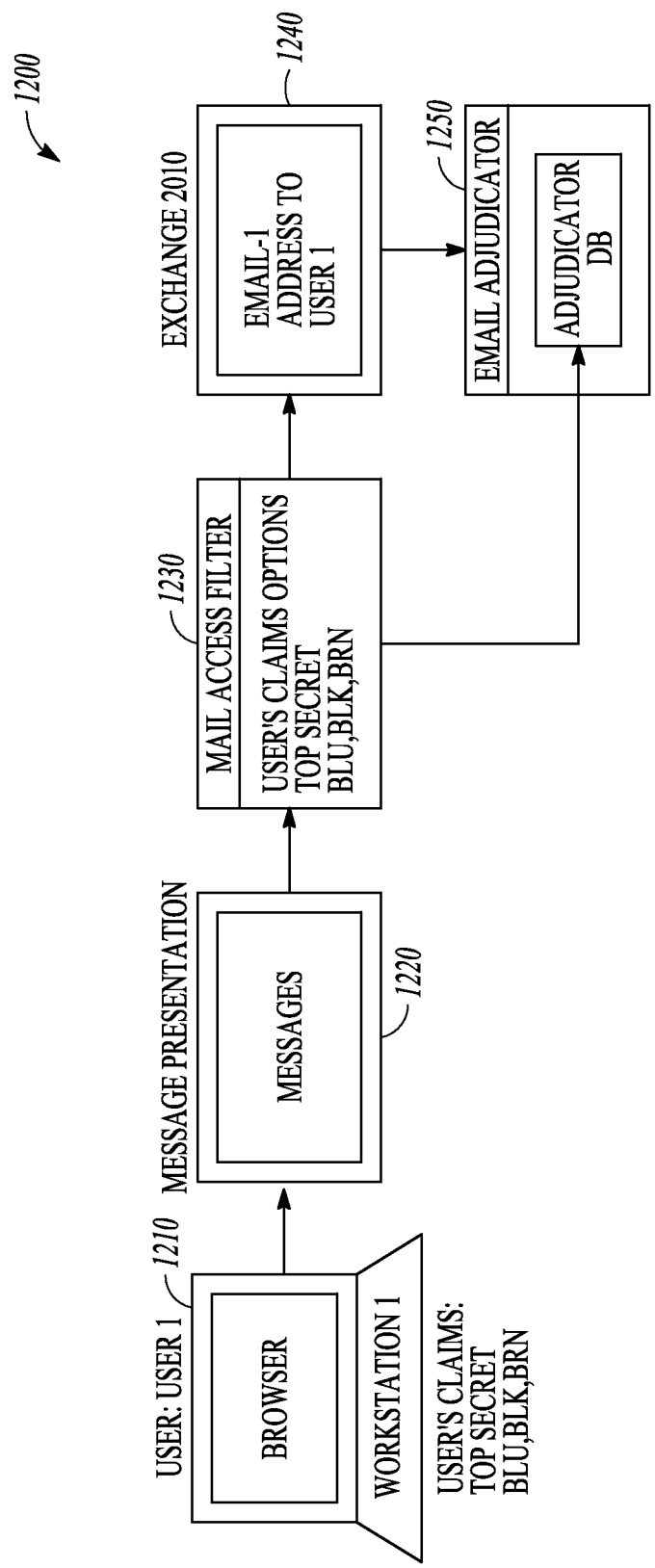
FIG. 12 is a block diagram of another email access filter.

FIGS. 6-12, 17A, 17B, and 17C illustrate embodiments of claims-based, location-aware, compartmented, and adjudicated email, web email, and SharePoint-based email. At 1702, a computer processor is configured to enable a user to create an electronic mail message. (FIG. 6, Nos. 610, 620; FIG. 7, Nos. 710, 720; FIG. 8, Nos. 810, 820; FIG. 10, Nos. 1010, 1040; FIG. 11, Nos. 1110, 1120). At 1704, the computer processor looks up or receives a user security token for the user. At 1706, the computer processor enables a user to label the electronic mail message using a classification line and to apply a user security level from the user security token as metadata to the electronic mail message. (FIG. 6, Nos. 630, 640; FIG. 10, No. 1020; FIG. 11, No. 1130). At 1708, the computer processor analyzes the electronic mail message to determine an adjudicated security level as a function of content of the electronic mail message. (FIG. 6, No. 660; FIG. 7, No. 760; FIG. 9, No. 930; FIG. 10, No. 1050; FIG. 11, No. 1150; FIG. 12, No. 1250). At 1710, the computer processor records an electronic mail message identifier and the adjudicated security level. At 1712, the computer processor compares the user security token with the adjudicated security level. At 1714, the computer processor validates the user security level of the electronic mail message with a mail security level as a function of the comparison of the user security token with the adjudicated security level. At 1716, the computer processor looks up a recipient security level. At 1718, the computer processor compares the recipient security level with the mail security level of the labeled electronic mail message. At 1720, the computer processor removes the recipient from the labeled electronic mail message or maintains the recipient on the labeled electronic mail message as a function of the comparison of the recipient security level with the mail security level of the labeled electronic mail message. (FIG. 6, No. 650; FIG. 8, No. 830; FIG. 10, Nos. 1030, 1060; FIG. 11, No. 1140; FIG. 12, No. 1240). At 1722, the computer processor transmits a message to a security officer as a function of the comparison of the user security token with the adjudicated security level and the comparison of the recipient security token with the mail security level of the labeled electronic mail message. At 1724, the computer processor transmits the labeled electronic mail message to the recipient when the recipient is maintained on the labeled electronic mail message.

At 1726, the computer processor looks up a second security level for the recipient. At 1728, the computer processor compares the second recipient security level with the mail security level of the transmitted electronic mail message. At 1730, the computer processor places the transmitted electronic mail message in an inbox for the recipient when the second recipient security token is greater than or equal to the mail security level of the transmitted electronic mail message. (FIG. 7, Nos. 730, 740, 750; FIG. 9, Nos. 910, 920, 940, 950; FIG. 12, Nos. 1210, 1220, 1230).

At 1732, the user security token, the recipient security level, and the second recipient security level include a first portion relating to a security clearance and a second portion relating to a security caveat. At 1734, the security clearance includes one or more of unclassified, confidential, secret, or top secret, and the security caveat comprises a particular topic. At 1736, the user security token includes a first portion relating to the user and a second portion relating to a device associated with the user. At 1738, the recipient security level and the second recipient security level includes a first portion relating to the recipient and a second portion relating to a device associated with the recipient. At 1740, the user security token is generated using a directory, the directory includes a security clearance and a security caveat for the user and a security clearance and security caveat for the device associated with the user. At 1742, the recipient security level and second recipient security level are generated using a user directory object. The user directory object includes a security clearance and security caveat for the recipient and a security clearance and security caveat for the device associated with the recipient.

At 1744, the mail security level comprises metadata that is associated with the electronic mail message. At 1746, the labeling the electronic mail message with the mail security level as a function of the comparison of the user security token with the adjudicated security level includes labeling the electronic mail message with the adjudicated security level when the user security token is less than or equal to the adjudicated security level, and saving the electronic mail message without transmitting the electronic mail message to the recipient and sending the message to the security officer.

At 1748, the computer processor checks for the user security token in a request to compose the electronic mail message, and when the request to compose the electronic mail message does not include the user security token, the computer processor generates the user security token. At 1750, the computer processor automatically generates the user security token when the user logs on to the system. At 1752, the mail security level is stored as metadata associated with the electronic mail message. At 1754, the computer processor processes the electronic mail message at the user security token level or the adjudicated security level as a function of a decision by the security officer. At 1756, the analyzing by the computer processor includes scanning the electronic mail message for an appearance of one or more keywords. Each of the one of more keywords is associated with a particularly security level. At 1758, the user security token is generated by a union of a user security clearance and a device security clearance. The union includes a least security clearance between the user and the device.

At 1760, the computer processor generates a workflow process when the user does not agree to process the electronic mail message using the adjudicated security level. The workflow process is provided to the security officer. At 1762, the computer processor generates the user security token by compiling a user security clearance, one or more user security caveats, a device security clearance, and one or more device caveats into a group, and the computer processor transfers ownership of the electronic mail message from the user to the security officer. At 1764, the computer processor includes a Sharepoint® system. At 1766, the user security token and the recipient security token include a unitary token comprising a security clearance and a security caveat.

Figure 13A:
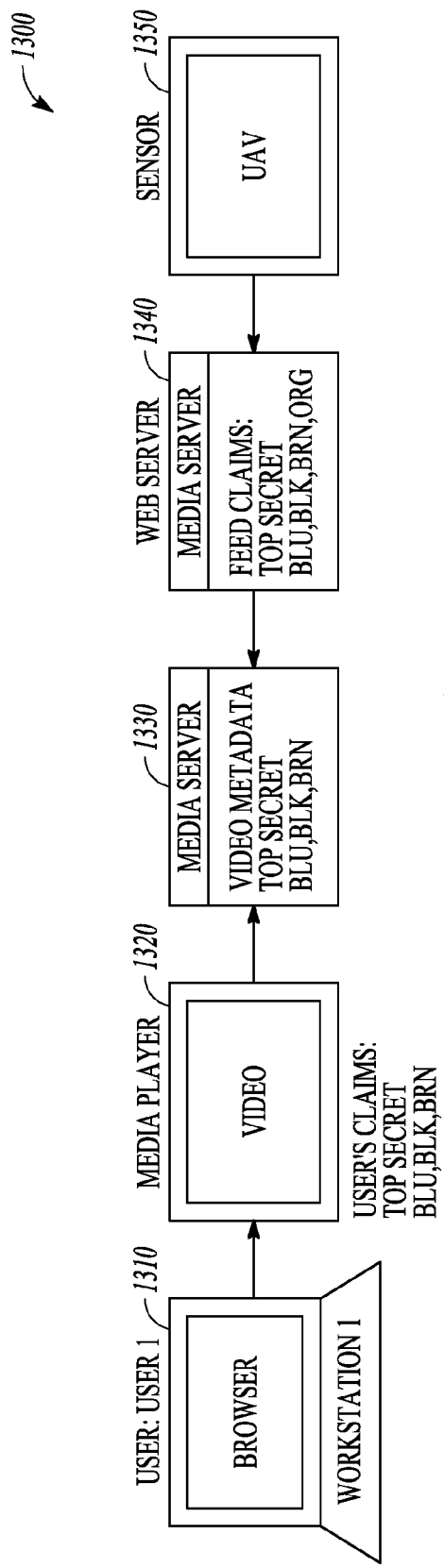
FIGS. 13A and 13B are block diagram of a claims-based, location-aware media player and filter.
Figure 13B:
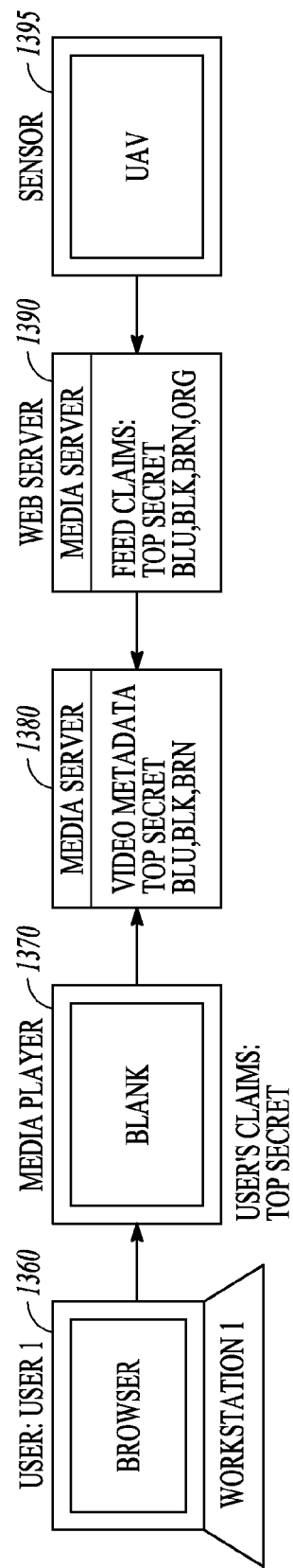
Figure 18:
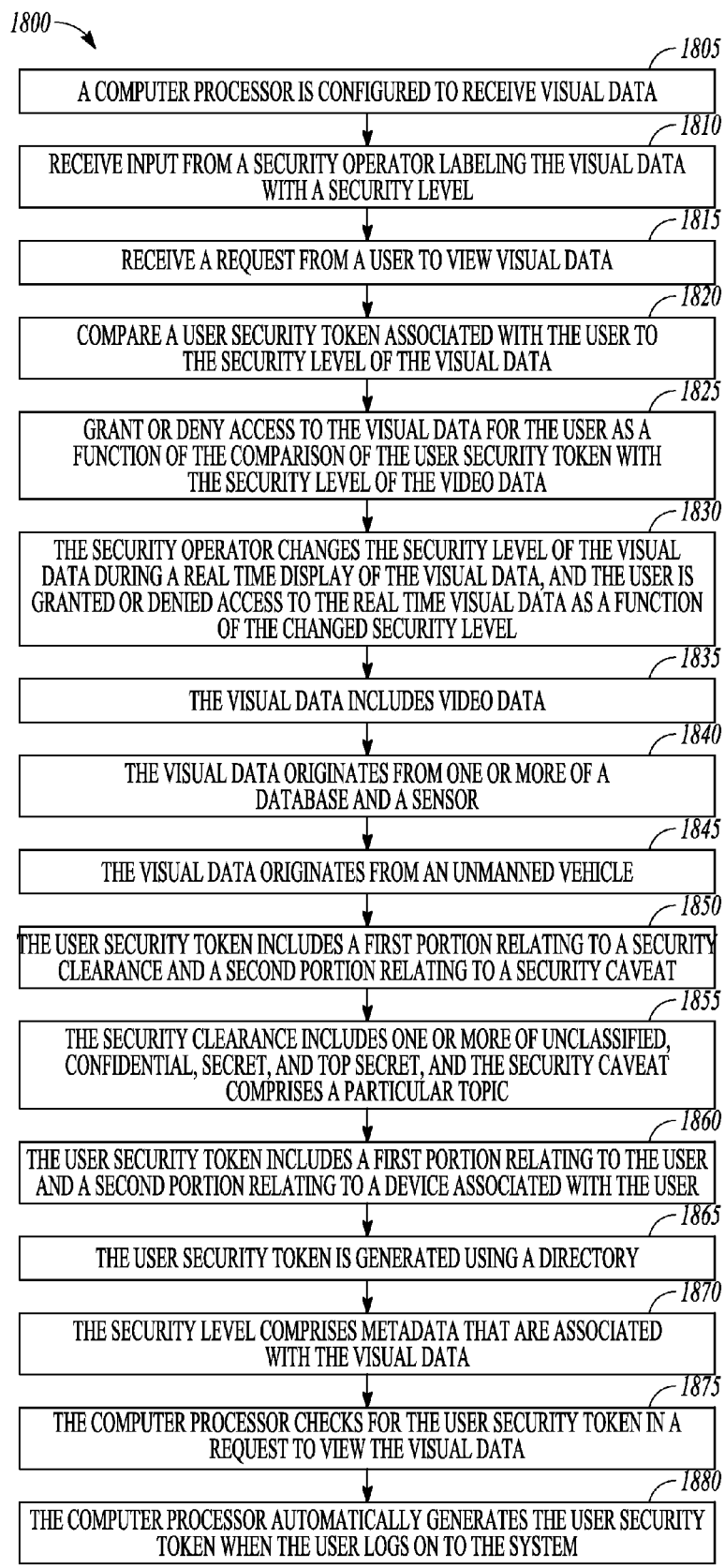
FIG. 18 is a flowchart-like block diagram illustrating process steps and features of a claims-based, location-aware media player and filter.

FIGS. 13 and 18 illustrate an embodiment of a claims-based, location-aware media player and filter. At 1805, a computer processor is configured to receive visual data. (FIG. 13, Nos. 1350, 1395). At 1810, the computer processor receives input from a security operator labeling the visual data with a security level. (FIG. 13, No. 1340, 1390). At 1815, the computer processor receives a request from a user to view the visual data. (FIG. 13, Nos. 1310, 1360). At 1820, the computer processor compares a user security token associated with the user to the security level of the visual data. (FIG. 13, Nos. 1330, 1380). At 1825, the computer processor grants or denies access to the visual data for the user as a function of the comparison of the user security token with the security level of the video data. (FIG. 13, Nos. 1320, 1370).

At 1830, the security operator changes the security level of the visual data during a real time display of the visual data, and the user is granted or denied access to the real time visual data as a function of the changed security level. At 1835, the visual data includes video data. At 1840, the visual data originates from one or more of a database and a sensor. At 1845, the visual data originates from an unmanned vehicle.

At 1850, the user security token includes a first portion relating to a security clearance and a second portion relating to a security caveat. At 1855, the security clearance includes one or more of unclassified, confidential, secret, and top secret, and the security caveat comprises a particular topic. At 1860, the user security token includes a first portion relating to the user and a second portion relating to a device associated with the user. At 1865, the user security token is generated using a directory. The directory includes a security clearance and a security caveat for the user and a security clearance and security caveat for a device associated with the user. At 1870, the security level comprises metadata that are associated with the visual data.

At 1875, the computer processor checks for the user security token in a request to view the visual data. When the request to view the visual data does not include the user security token, the computer processor generates the user security token. At 1880, the computer processor automatically generates the user security token when the user logs on to the system.

Figure 14:
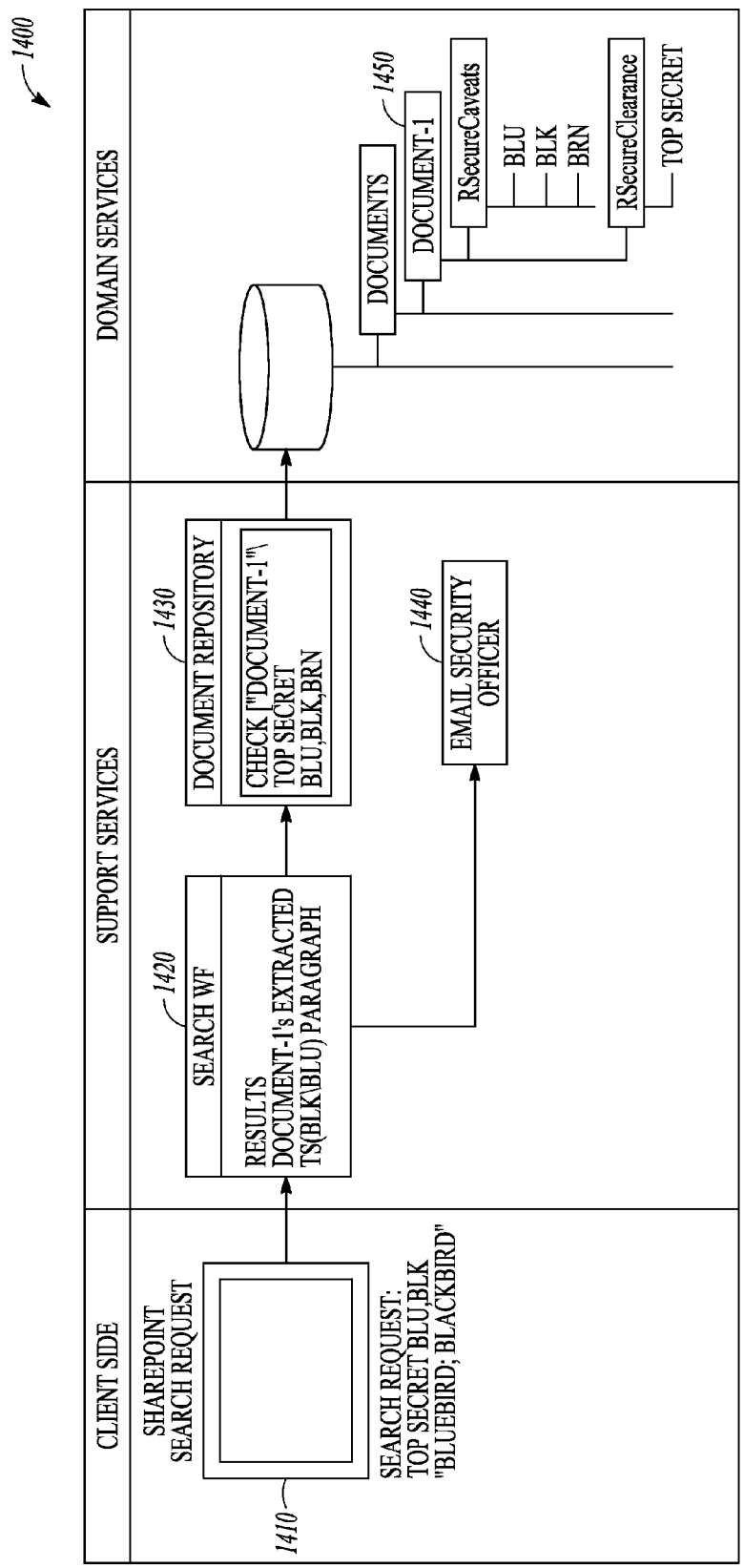
FIG. 14 is a block diagram of a claims-based, location-aware deep dive search engine.
Figure 15A:
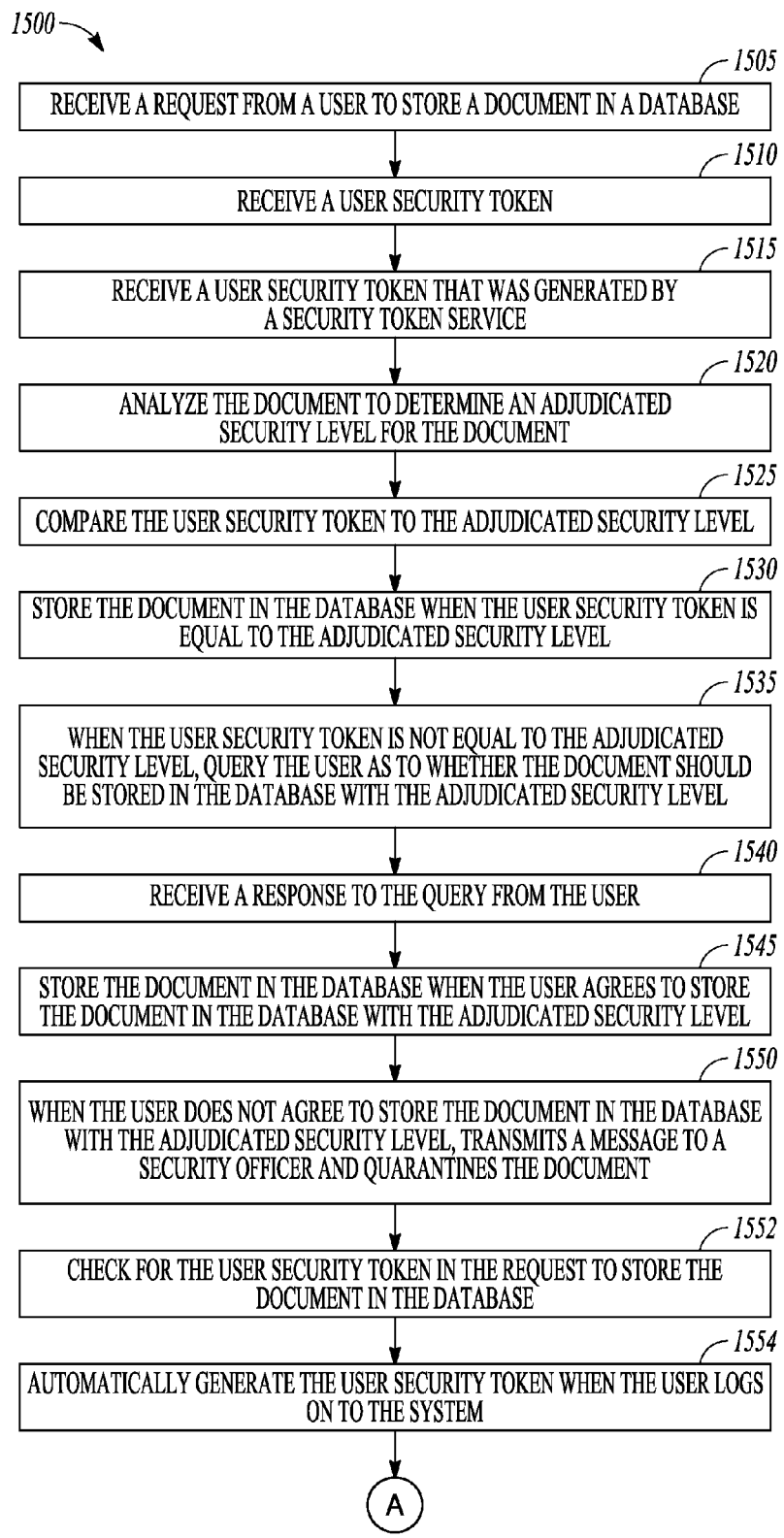
FIGS. 15A, 15B, and 15C are a flowchart-like block diagram illustrating process steps and features of a claims-based, location-aware, compartmented, and adjudicated file storage system.
Figure 15B:
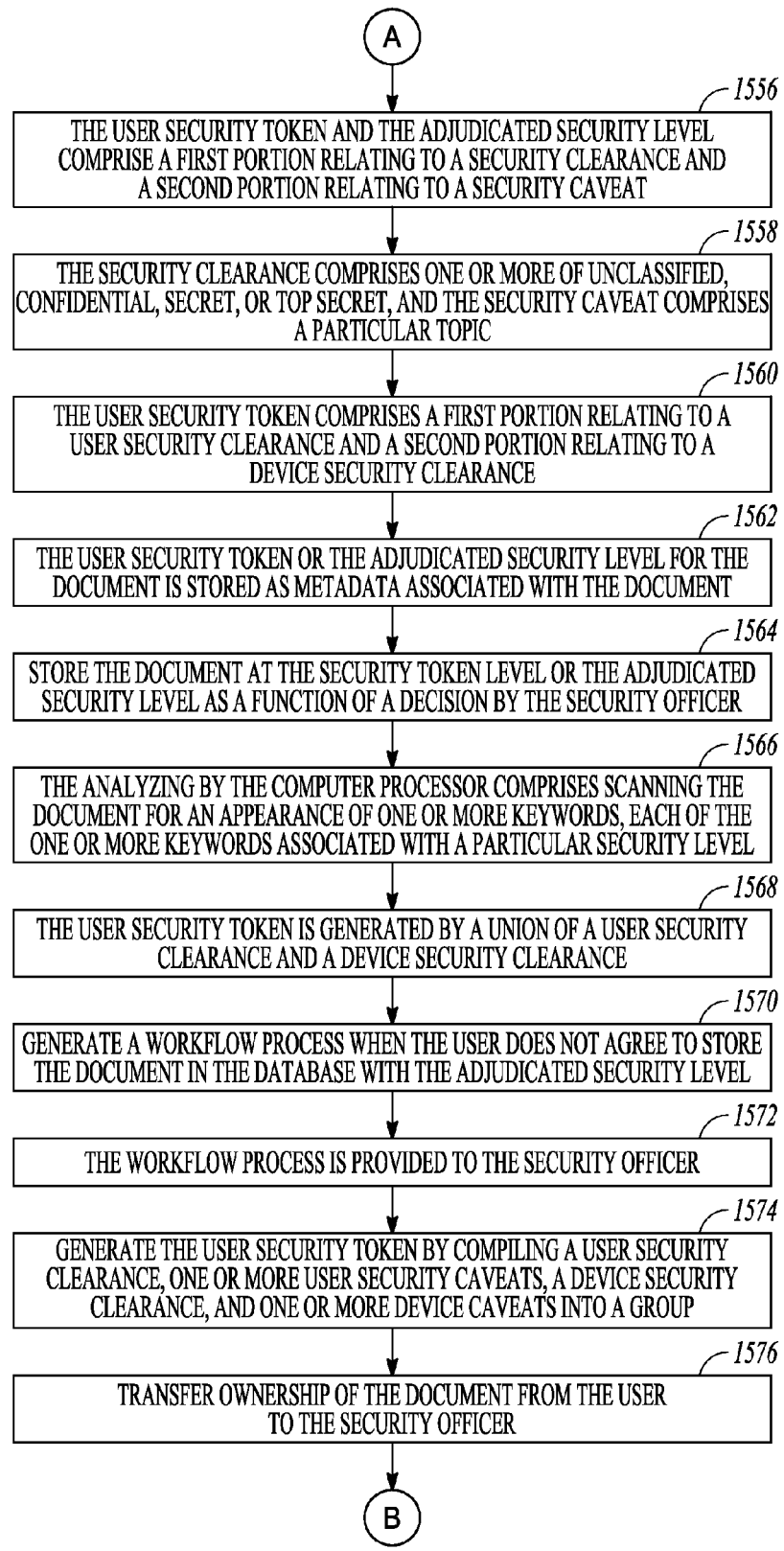
Figure 15C:
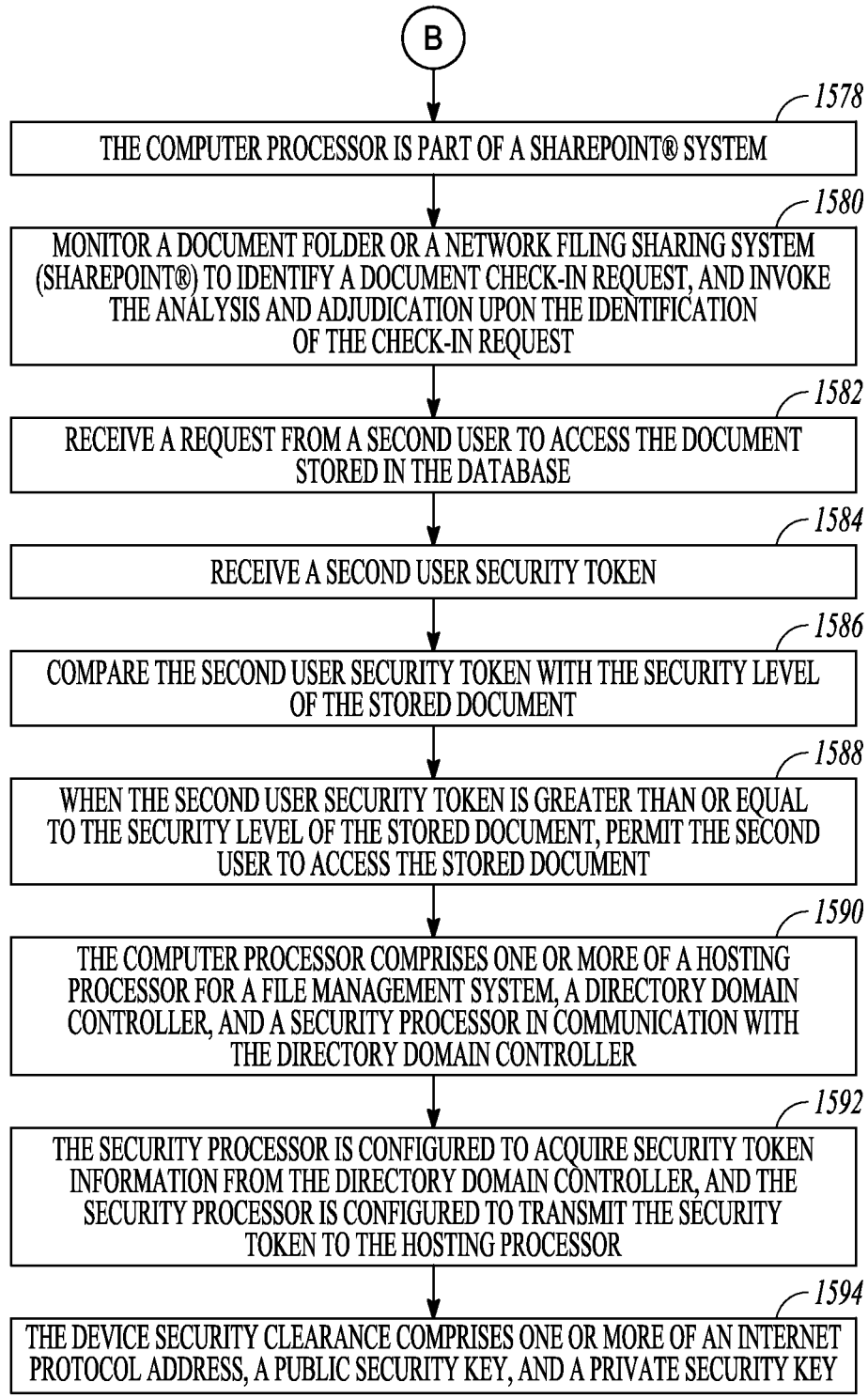
Figure 19:
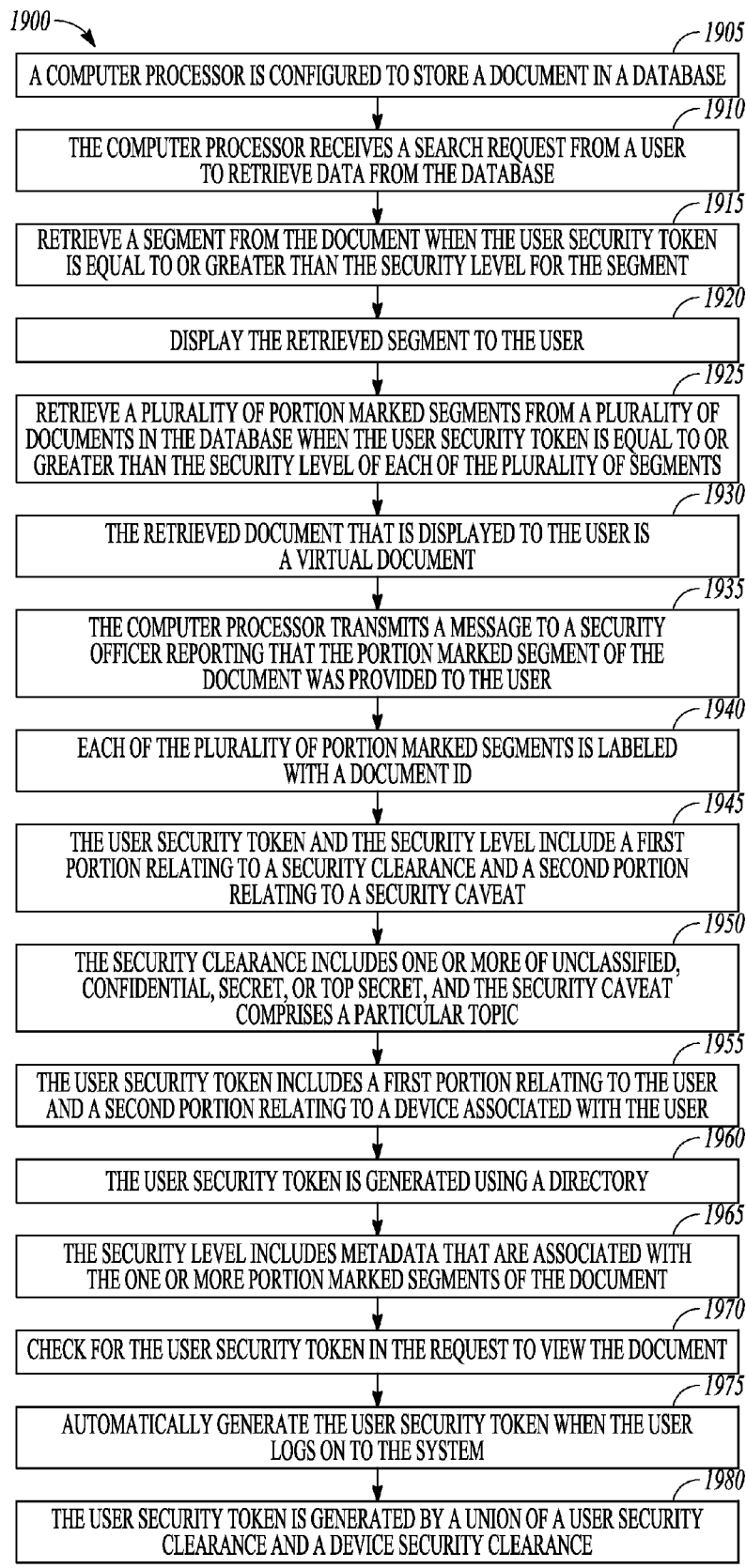
FIG. 19 is a flowchart-like block diagram illustrating process steps and features of a claims-based, location-aware deep dive search engine.

FIGS. 14 and 19 illustrate an embodiment of a claims-based, location-aware deep dive search engine. At 1905, a computer processor is configured to store a document in a database. The document includes a plurality of portion marked segments. Each of the plurality of portion marked segments is labeled with a security level. At 1910, the computer processor receives a search request from a user to retrieve data from the database. (FIG. 14, No. 1410). A user security token is associated with the user. At 1915, the computer processor retrieves a segment from the document when the user security token is equal to or greater than the security level for the segment. (FIG. 14, Nos. 1420, 1430, 1450). At 1920, the computer processor displays the retrieved segment to the user.

At 1925, the computer processor retrieves a plurality of portion marked segments from a plurality of documents in the database when the user security token is equal to or greater than the security level of each of the plurality of segments. At 1930, the retrieved document that is displayed to the user is a virtual document. A virtual document is an electronic document that includes the portions of a stored document that a user has the security level to view. The virtual document is normally not stored as a document, but normally exists only while the user is viewing the virtual document.

At 1935, the computer processor transmits a message to a security officer reporting that the portion marked segment of the document was provided to the user. (FIG. 14, No. 1440). At 1940, each of the plurality of portion marked segments is labeled with a document id. At 1945, the user security token and the security level include a first portion relating to a security clearance and a second portion relating to a security caveat. At 1950, the security clearance includes one or more of unclassified, confidential, secret, or top secret, and the security caveat comprises a particular topic. At 1955, the user security token includes a first portion relating to the user and a second portion relating to a device associated with the user. At 1960, the user security token is generated using a directory. The directory includes a security clearance and a security caveat for the user and a security clearance and security caveat for the device associated with the user. At 1965, the security level includes metadata that are associated with the one or more portion marked segments of the document.

At 1970, the computer processor checks for the user security token in the request to view the document. When the request to view the document in the database does not include the user security token, the computer processor generates the user security token. At 1975, the computer processor automatically generates the user security token when the user logs on to the system. At 1980, the user security token is generated by a union of a user security clearance and a device security clearance. The union includes a least security clearance between the user and the device.

Figure 20:
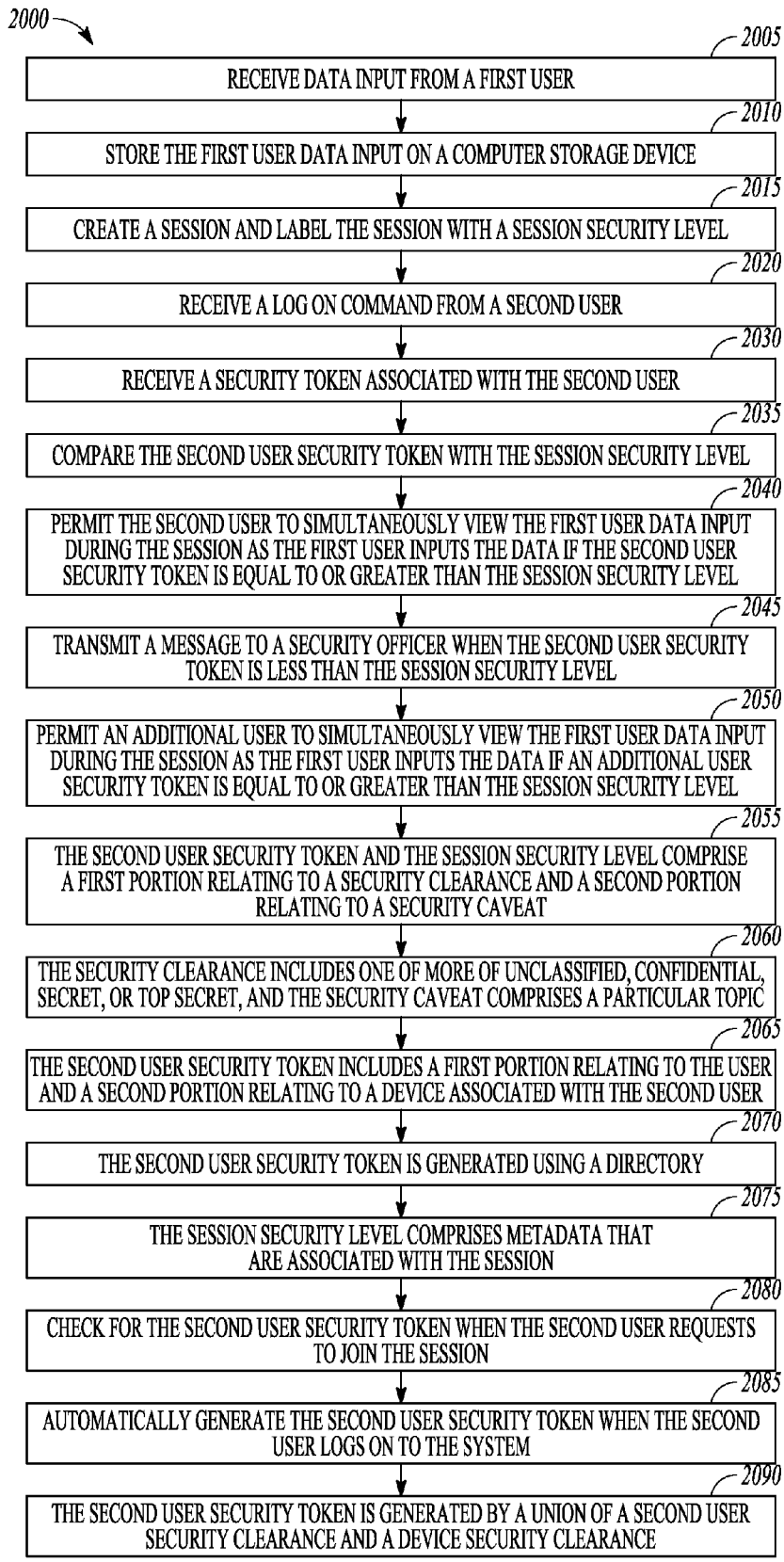
FIG. 20 is a flowchart-like block diagram illustrating process steps and features of a claims-based, location-aware and compartmented electronic white board system.

FIG. 20 is a block diagram of a claims-based, location-aware, and compartmented electronic white boarding system. At 2005, a computer processor is configured to receive data input from a first user. At 2010, the computer processor stores the first user data input on a computer storage device. At 2015, the computer processor creates a session and labels the session with a session security level. At 2020, the computer processor receives a log on command from a second user. At 2030, the computer processor receives a security token associated with the second user. At 2035, the computer processor compares the second user security token with the session security level. At 2040, the computer processor permits the second user to simultaneously view the first user data input during the session as the first user inputs the data if the second user security token is equal to or greater than the session security level. At 2045, the computer processor transmits a message to a security officer when the second user security token is less than the session security level.

At 2050, the computer processor permits an additional user to simultaneously view the first user data input during the session as the first user inputs the data if an additional user security token is equal to or greater than the session security level. At 2055, the second user security token and the session security level comprise a first portion relating to a security clearance and a second portion relating to a security caveat. At 2060, the security clearance includes one of more of unclassified, confidential, secret, or top secret, and the security caveat comprises a particular topic. At 2065, the second user security token includes a first portion relating to the user and a second portion relating to a device associated with the second user. At 2070, the second user security token is generated using a directory. The directory includes a security clearance and a security caveat for the second user and a security clearance and security caveat for the device associated with the second user. At 2075, the session security level comprises metadata that are associated with the session.

At 2080, the computer processor checks for the second user security token when the second user requests to join the session. When there is not a second user security token associated with the second user at the time of the request to join the session, the computer processor generates the second user security token. At 2085, the computer processor automatically generates the second user security token when the second user logs on to the system. At 2090, the second user security token is generated by a union of a second user security clearance and a device security clearance. The union includes a least security clearance between the second user and the device.

EXAMPLE EMBODIMENTS

Example No. 1 is a system comprising a computer processor configured to receive a request from a user to store a document in a database; receive a user security token; analyze the document to determine an adjudicated security level for the document; compare the user security token to the adjudicated security level; store the document in the database when the user security token is equal to the adjudicated security level; when the user security token is not equal to the adjudicated security level, query the user as to whether the document should be stored in the database with the adjudicated security level; receive a response to the query from the user; store the document in the database when the user agrees to store the document in the database with the adjudicated security level; and when the user does not agree to store the document in the database with the adjudicated security level, transmit a message to a security officer and quarantine the document.

Example No. 2 includes the features of Example No. 1 and optionally includes a system wherein the computer processor is configured to check for the user security token in the request to store the document in the database; and wherein when the request to store the document in the database does not include a user security token, the computer processor is configured to generate a user security token.

Example No. 3 includes the features of Example Nos. 1-2 and optionally includes a system wherein the computer processor is configured to automatically generate the user security token when the user logs on to the system.

Example No. 4 includes the features of Example Nos. 1-3 and optionally includes a system wherein the user security token and the adjudicated security level comprise a first portion relating to a security clearance and a second portion relating to a security caveat.

Example No. 5 includes the features of Example Nos. 1-4 and optionally includes a system wherein the security clearance comprises one or more of unclassified, confidential, secret, or top secret, and the security caveat comprises a particular topic.

Example No. 6 includes the features of Example Nos. 1-5 and optionally includes a system wherein the user security token comprises a first portion relating to a user security clearance and a second portion relating to a device security clearance.

Example No. 7 includes the features of Example Nos. 1-6 and optionally includes a system wherein the user security token or the adjudicated security level for the document is stored as metadata associated with the document.

Example No. 8 includes the features of Example Nos. 1-7 and optionally includes a system wherein the computer processor is configured to store the document at the security token level or the adjudicated security level as a function of a decision by the security officer.

Example No. 9 includes the features of Example Nos. 1-8 and optionally includes a system wherein the analyzing by the computer processor comprises scanning the document for an appearance of one or more keywords, each of the one of more keywords associated with a particular security level.

Example No. 10 includes the features of Example Nos. 1-9 and optionally includes a system wherein the user security token is generated by a union of a user security clearance and a device security clearance, the union comprising a least security clearance between the user and the device.

Example No. 11 includes the features of Example Nos. 1-10 and optionally includes a system wherein the computer processor is configured to generate a workflow process when the user does not agree to store the document in the database with the adjudicated security level; and wherein the workflow process is provided to the security officer.

Example No. 12 includes the features of Example Nos. 1-11 and optionally includes a system wherein the computer processor is configured to generate the user security token by compiling a user security clearance, one or more user security caveats, a device security clearance, and one or more device caveats into a group; and transfer ownership of the document from the user to the security officer.

Example No. 13 includes the features of Example Nos. 1-12 and optionally includes a system wherein the computer processor comprises a Sharepoint® system.

Example No. 14 includes the features of Example Nos. 1-13 and optionally includes a system wherein the computer processor is configured to monitor a document folder or a network filing sharing system to identify a document check-in request, and to invoke the analysis and adjudication upon the identification of the check-in request.

Example No. 15 includes the features of Example Nos. 1-14 and optionally includes a system wherein the computer processor is configured to receive a request from a second user to access the document stored in the database; receive a second user security token; compare the second user security token with the security level of the stored document; and when the second user security token is greater than or equal to the security level of the stored document, permit the second user to access the stored document.

Example No. 16 includes the features of Example Nos. 1-15 and optionally includes a system wherein the computer processor comprises one or more of a hosting processor for a file management system, a directory domain controller, and a security processor in communication with the directory domain controller.

Example No. 17 includes the features of Example Nos. 1-16 and optionally includes a system wherein the security processor is configured to acquire security token information from the directory domain controller, and wherein the security processor is configured to transmit the security token to the hosting processor.

Example No. 18 includes the features of Example Nos. 1-17 and optionally includes a system wherein the device security clearance comprises one or more of an Internet Protocol address, a public security key, and a private security key.

Example No. 19 is a system including a computer processor configured to receive a user security token; receive a labeled message from a user; store the message from the user in a computer storage device, the computer storage device comprising a list security level; analyze the content of the message and assign an adjudicated security level to the message as a function of the analysis; compare the adjudicated security level to the list security level; post the message for one or more other users to view when the adjudicated security level is less than or equal to the list security level; and when the adjudicated security level is greater than the list security level, notify the user without disclosing additional information to the user and transmit a second message to a security officer.

Example No. 20 includes the features of Example No. 19 and optionally includes a system wherein the computer processor is configured to post the message for one or more other users to view when the user agrees to override the adjudicated security level.

Example No. 21 includes the features of Example Nos. 19-20 and optionally includes a system wherein the second message to the security officer comprises a notice of the attempt to post the message by the user and a workflow in response to the attempt to post the message by the user.

Example No. 22 includes the features of Example Nos. 19-21 and optionally includes a system wherein the computer processor is configured to receive a response from the security officer; and post the message or quarantine the message as a function of the response from the security officer.

Example No. 23 includes the features of Example Nos. 19-22 and optionally includes a system wherein the message from the user comprises an instant message.

Example No. 24 includes the features of Example Nos. 19-23 and optionally includes a system wherein the computer storage device comprises an electronic chat room or an electronic message board.

Example No. 25 includes the features of Example Nos. 19-24 and optionally includes a system wherein the list security level and the adjudicated security level comprise a first portion relating to a security clearance and a second portion relating to a security caveat.

Example No. 26 includes the features of Example Nos. 19-25 and optionally includes a system wherein the security clearance comprises one or more of unclassified, confidential, secret, or top secret, and the security caveat comprises a particular topic.

Example No. 27 includes the features of Example Nos. 19-26 and optionally includes a system wherein the device security level or the adjudicated security level is stored as metadata associated with the message.

Example No. 28 includes the features of Example Nos. 19-27 and optionally includes a system wherein the analyzing the content of the message by the computer processor comprises scanning the message for an appearance of one or more keywords, each of the one or more keywords associated with a particularly security level.

Example No. 29 includes the features of Example Nos. 19-28 and optionally includes a system wherein the computer processor is configured to receive a request from a second user to view the message; receive a second user security token; compare the second user security token with the security level of the message; when the second user security token is greater than or equal to the security level of the message, permit the second user to view the message; and when the second user security token is less than the security level of the message, transmit a message to the security officer.

Example No. 30 includes the features of Example Nos. 19-29 and optionally includes a system wherein the computer processor comprises one or more of an instant messaging server, an instant messaging adjudicator, a message repository, and a directory domain controller for the message repository.

Example No. 31 is a system that includes a computer processor configured to enable a user to create an electronic mail message; lookup or receive a user security token for the user; enable a user to label the electronic mail message using a classification line and apply a user security level from the user security token as metadata to the electronic mail message; analyze the electronic mail message to determine an adjudicated security level as a function of content of the electronic mail message; record an electronic mail message identifier and the adjudicated security level; compare the user security token with the adjudicated security level; validate the user security level of the electronic mail message with a mail security level as a function of the comparison of the user security token with the adjudicated security level; lookup a recipient security level; compare the recipient security level with the mail security level of the labeled electronic mail message; remove the recipient from the labeled electronic mail message or maintain the recipient on the labeled electronic mail message as a function of the comparison of the recipient security level with the mail security level of the labeled electronic mail message; transmit a message to a security officer as a function of the comparison of the user security token with the adjudicated security level and the comparison of the recipient security token with the mail security level of the labeled electronic mail message; and transmit the labeled electronic mail message to the recipient when the recipient is maintained on the labeled electronic mail message.

Example No. 32 includes the features of Example No. 31 and optionally includes a system wherein the computer processor is configured to lookup a second security level for the recipient; compare the second recipient security level with the mail security level of the transmitted electronic mail message; and place the transmitted electronic mail message in an inbox for the recipient when the second recipient security token is greater than or equal to the mail security level of the transmitted electronic mail message.

Example No. 33 includes the features of Example Nos. 31-32 and optionally includes a system wherein the user security token, the recipient security level, and the second recipient security level comprise a first portion relating to a security clearance and a second portion relating to a security caveat.

Example No. 34 includes the features of Example Nos. 31-33 and optionally includes a system wherein the security clearance comprises one or more of unclassified, confidential, secret, or top secret, and the security caveat comprises a particular topic.

Example No. 35 includes the features of Example Nos. 31-34 and optionally includes a system wherein the user security token comprises a first portion relating to the user and a second portion relating to a device associated with the user; the recipient security level and the second recipient security level comprise a first portion relating to the recipient and a second portion relating to a device associated with the recipient.

Example No. 36 includes the features of Example Nos. 31-35 and optionally includes a system wherein the user security token is generated using a directory, the directory comprising a security clearance and a security caveat for the user and a security clearance and security caveat for the device associated with the user; and wherein the recipient security level and second recipient security level are generated using a user directory object, the user directory object comprising a security clearance and security caveat for the recipient and a security clearance and security caveat for the device associated with the recipient.

Example No. 37 includes the features of Example Nos. 31-36 and optionally includes a system wherein the mail security level comprises metadata that is associated with the electronic mail message.

Example No. 38 includes the features of Example Nos. 31-37 and optionally includes a system wherein the labeling the electronic mail message with the mail security level as a function of the comparison of the user security token with the adjudicated security level comprises labeling the electronic mail message with the adjudicated security level when the user security token is less than or equal to the adjudicated security level; and saving the electronic mail message without transmitting the electronic mail message to the recipient and sending the message to the security officer.

Example No. 39 includes the features of Example Nos. 31-38 and optionally includes a system wherein the computer processor is configured to check for the user security token in a request to compose the electronic mail message; and wherein when the request to compose the electronic mail message does not include the user security token, the computer processor is configured to generate the user security token.

Example No. 40 includes the features of Example Nos. 31-39 and optionally includes a system wherein the computer processor is configured to automatically generate the user security token when the user logs on to the system.

Example No. 41 includes the features of Example Nos. 31-40 and optionally includes a system wherein the mail security level is stored as metadata associated with the electronic mail message.

Example No. 42 includes the features of Example Nos. 31-41 and optionally includes a system wherein the computer processor is configured to process the electronic mail message at the user security token level or the adjudicated security level as a function of a decision by the security officer.

Example No. 43 includes the features of Example Nos. 31-42 and optionally includes a system wherein the analyzing by the computer processor comprises scanning the electronic mail message for an appearance of one or more keywords, each of the one of more keywords associated with a particularly security level.

Example No. 44 includes the features of Example Nos. 31-43 and optionally includes a system wherein the user security token is generated by a union of a user security clearance and a device security clearance, the union comprising a least security clearance between the user and the device.

Example No. 45 includes the features of Example Nos. 31-44 and optionally includes a system wherein the computer processor is configured to generate a workflow process when the user does not agree to process the electronic mail message using the adjudicated security level; and wherein the workflow process is provided to the security officer.

Example No. 46 includes the features of Example Nos. 31-45 and optionally includes a system wherein the computer processor is configured to generate the user security token by compiling a user security clearance, one or more user security caveats, a device security clearance, and one or more device caveats into a group; and transfer ownership of the electronic mail message from the user to the security officer.

Example No. 47 includes the features of Example Nos. 31-46 and optionally includes a system wherein the computer processor comprises a Sharepoint® system.

Example No. 48 includes the features of Example Nos. 31-47 and optionally includes a system wherein the user security token and the recipient security token comprise a unitary token comprising a security clearance and a security caveat.

Example No. 49 is a system that includes a computer processor configured to receive visual data; receive input from a security operator labeling the visual data with a security level; receive a request from a user to view the visual data; compare a user security token associated with the user to the security level of the visual data; and grant or deny access to the visual data for the user as a function of the comparison of the user security token with the security level of the video data.

Example No. 50 includes the features of Example No. 49 and optionally includes a system wherein the security operator changes the security level of the visual data during a real time display of the visual data, and the user is granted or denied access to the real time visual data as a function of the changed security level.

Example No. 51 includes the features of Example Nos. 49-50 and optionally includes a system wherein the visual data comprises video data.

Example No. 52 includes the features of Example Nos. 49-51 and optionally includes a system wherein the visual data originates from one or more of a database and a sensor.

Example No. 53 includes the features of Example Nos. 49-52 and optionally includes a system wherein the visual data originates from an unmanned vehicle.

Example No. 54 includes the features of Example Nos. 49-53 and optionally includes a system wherein the user security token comprises a first portion relating to a security clearance and a second portion relating to a security caveat.

Example No. 55 includes the features of Example Nos. 49-54 and optionally includes a system wherein the security clearance comprises one or more of unclassified, confidential, secret, and top secret, and the security caveat comprises a particular topic.

Example No. 56 includes the features of Example Nos. 49-55 and optionally includes a system wherein the user security token comprises a first portion relating to the user and a second portion relating to a device associated with the user.

Example No. 57 includes the features of Example Nos. 49-56 and optionally includes a system wherein the user security token is generated using a directory, the directory comprising a security clearance and a security caveat for the user and a security clearance and security caveat for a device associated with the user.

Example No. 58 includes the features of Example Nos. 49-57 and optionally includes a system wherein the security level comprises metadata that is associated with the visual data.

Example No. 60 includes the features of Example Nos. 49-59 and optionally includes a system wherein the computer processor is configured to check for the user security token in a request to view the visual data; and wherein when the request to view the visual data does not include the user security token, the computer processor is configured to generate the user security token.

Example No. 61 includes the features of Example Nos. 49-60 and optionally includes a system wherein the computer processor is configured to automatically generate the user security token when the user logs on to the system.

Example No. 62 is a system that includes a computer processor configured to store a document in a database, the document including a plurality of portion marked segments, each of the plurality of portion marked segments labeled with a security level; receive a search request from a user to retrieve data from the database, wherein a user security token is associated with the user; retrieve a segment from the document when the user security token is equal to or greater than the security level for the segment; and display the retrieved segment to the user.

Example No. 63 includes the features of Example No. 62 and optionally includes a system wherein the computer processor is configured to retrieve a plurality of portion marked segments from a plurality of documents in the database when the user security token is equal to or greater than the security level of each of the plurality of segments.

Example No. 64 includes the features of Example Nos. 62-63 and optionally includes a system wherein the retrieved document that is displayed to the user comprises a virtual document.

Example No. 65 includes the features of Example Nos. 62-64 and optionally includes a system wherein the computer processor is configured to transmit a message to a security officer reporting that the portion marked segment of the document was provided to the user.

Example No. 66 includes the features of Example Nos. 62-65 and optionally includes a system wherein each of the plurality of portion marked segments is labeled with a document id.

Example No. 67 includes the features of Example Nos. 62-66 and optionally includes a system wherein the user security token and the security level comprise a first portion relating to a security clearance and a second portion relating to a security caveat.

Example No. 68 includes the features of Example Nos. 62-67 and optionally includes a system wherein the security clearance comprises one or more of unclassified, confidential, secret, or top secret, and the security caveat comprises a particular topic.

Example No. 69 includes the features of Example Nos. 62-68 and optionally includes a system wherein the user security token comprises a first portion relating to the user and a second portion relating to a device associated with the user.

Example No. 70 includes the features of Example Nos. 62-69 and optionally includes a system wherein the user security token is generated using a directory, the directory comprising a security clearance and a security caveat for the user and a security clearance and security caveat for the device associated with the user.

Example No. 71 includes the features of Example Nos. 62-70 and optionally includes a system wherein the security level comprises metadata that is associated with the one or more portion marked segments of the document.

Example No. 72 includes the features of Example Nos. 62-71 and optionally includes a system wherein the computer processor is configured to check for the user security token in the request to view the document; and wherein when the request to view the document in the database does not include the user security token, the computer processor is configured to generate the user security token.

Example No. 73 includes the features of Example Nos. 62-72 and optionally includes a system wherein the computer processor is configured to automatically generate the user security token when the user logs on to the system.

Example No. 74 includes the features of Example Nos. 62-73 and optionally includes a system wherein the user security token is generated by a union of a user security clearance and a device security clearance, the union comprising a least security clearance between the user and the device.

Example No. 75 is a system that includes a computer processor configured to receive data input from a first user; store the first user data input on a computer storage device; create a session and label the session with a session security level; receive a log on command from a second user; receive a security token associated with the second user; compare the second user security token with the session security level; permit the second user to simultaneously view the first user data input during the session as the first user inputs the data if the second user security token is equal to or greater than the session security level; and transmit a message to a security officer when the second user security token is less than the session security level.

Example No. 76 includes the features of Example No. 75 and optionally includes a system wherein the computer processor is configured to permit an additional user to simultaneously view the first user data input during the session as the first user inputs the data if an additional user security token is equal to or greater than the session security level.

Example No. 77 includes the features of Example Nos. 75-76 and optionally includes a system wherein the second user security token and the session security level comprise a first portion relating to a security clearance and a second portion relating to a security caveat.

Example No. 78 includes the features of Example Nos. 75-77 and optionally includes a system wherein the security clearance comprises one of more of unclassified, confidential, secret, or top secret, and the security caveat comprises a particular topic.

Example No. 79 includes the features of Example Nos. 75-78 and optionally includes a system wherein the second user security token comprises a first portion relating to the user and a second portion relating to a device associated with the second user.

Example No. 80 includes the features of Example Nos. 75-79 and optionally includes a system wherein the second user security token is generated using a directory, the directory comprising a security clearance and a security caveat for the second user and a security clearance and security caveat for the device associated with the second user.

Example No. 81 includes the features of Example Nos. 75-80 and optionally includes a system wherein the session security level comprises metadata that is associated with the session.

Example No. 82 includes the features of Example Nos. 75-bland optionally includes a system wherein the computer processor is configured to check for the second user security token when the second user requests to join the session; and wherein when there is not a second user security token associated with the second user at the time of the request to join the session, the computer processor is configured to generate the second user security token.

Example No. 83 includes the features of Example Nos. 75-82 and optionally includes a system wherein the computer processor is configured to automatically generate the second user security token when the second user logs on to the system.

Example No. 84 includes the features of Example Nos. 75-83 and optionally includes a system wherein the second user security token is generated by a union of a second user security clearance and a device security clearance, the union comprising a least security clearance between the second user and the device.

Figure 21:
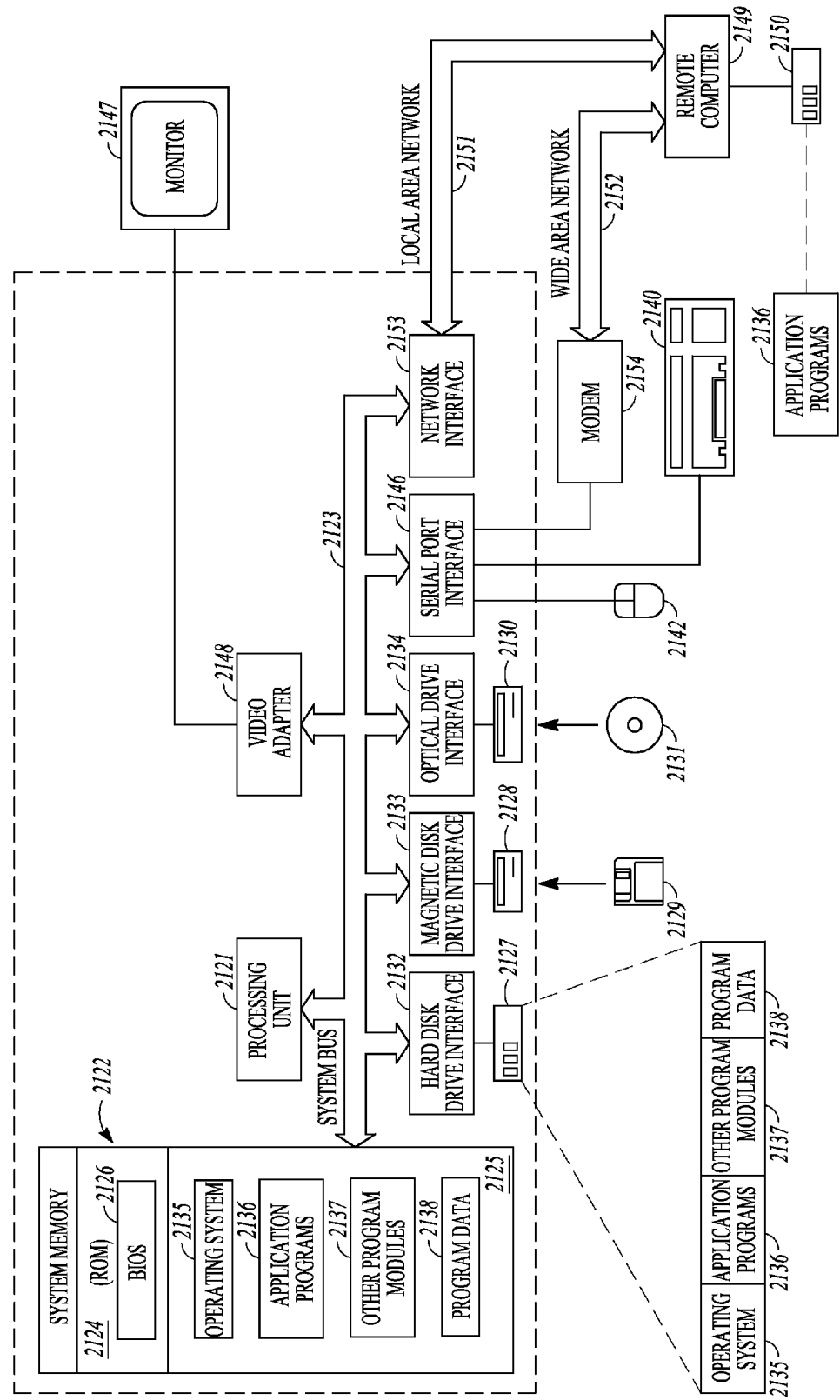
FIG. 21 is a block diagram of a computer system upon which one or more embodiments of the invention can operate.

Example No. 77 includes the features of Example Nos. 75-76 and optionally includes a system FIG. 21 is an overview diagram of a hardware and operating environment in conjunction with which embodiments of the invention may be practiced. The description of FIG. 21 is intended to provide a brief, general description of suitable computer hardware and a suitable computing environment in conjunction with which the invention may be implemented. In some embodiments, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computer environments where tasks are performed by I/O remote processing devices that are linked through a communications network. In a distributed computing environment, program modules may be located in both local and remote memory storage devices.

In the embodiment shown in FIG. 21, a hardware and operating environment is provided that is applicable to any of the servers and/or remote clients shown in the other Figures.

As shown in FIG. 21, one embodiment of the hardware and operating environment includes a general purpose computing device in the form of a computer 20 (e.g., a personal computer, workstation, or server), including one or more processing units 21, a system memory 22, and a system bus 23 that operatively couples various system components including the system memory 22 to the processing unit 21. There may be only one or there may be more than one processing unit 21, such that the processor of computer 20 comprises a single central-processing unit (CPU), or a plurality of processing units, commonly referred to as a multiprocessor or parallel-processor environment. A multiprocessor system can include cloud computing environments. In various embodiments, computer 20 is a conventional computer, a distributed computer, or any other type of computer.

The system bus 23 can be any of several types of bus structures including a memory bus or memory controller, a peripheral bus, and a local bus using any of a variety of bus architectures. The system memory can also be referred to as simply the memory, and, in some embodiments, includes read-only memory (ROM) 24 and random-access memory (RAM) 25. A basic input/output system (BIOS) program 26, containing the basic routines that help to transfer information between elements within the computer 20, such as during start-up, may be stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non volatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 29, optical disk 31, ROM 24, or RAM 25, including an operating system 35, one or more application programs 36, other program modules 37, and program data 38. A plug in containing a security transmission engine for the present invention can be resident on any one or number of these computer-readable media.

A user may enter commands and information into computer 20 through input devices such as a keyboard 40 and pointing device 42. Other input devices (not shown) can include a microphone, joystick, game pad, satellite dish, scanner, or the like. These other input devices are often connected to the processing unit 21 through a serial port interface 46 that is coupled to the system bus 23, but can be connected by other interfaces, such as a parallel port, game port, or a universal serial bus (USB). A monitor 47 or other type of display device can also be connected to the system bus 23 via an interface, such as a video adapter 48. The monitor 47 can display a graphical user interface for the user. In addition to the monitor 47, computers typically include other peripheral output devices (not shown), such as speakers and printers.

The computer 20 may operate in a networked environment using logical connections to one or more remote computers or servers, such as remote computer 49. These logical connections are achieved by a communication device coupled to or a part of the computer 20; the invention is not limited to a particular type of communications device. The remote computer 49 can be another computer, a server, a router, a network PC, a client, a peer device or other common network node, and typically includes many or all of the elements described above I/O relative to the computer 20, although only a memory storage device 50 has been illustrated. The logical connections depicted in FIG. 21 include a local area network (LAN) 51 and/or a wide area network (WAN) 52. Such networking environments are commonplace in office networks, enterprise-wide computer networks, intranets and the internet, which are all types of networks.

When used in a LAN-networking environment, the computer 20 is connected to the LAN 51 through a network interface or adapter 53, which is one type of communications device. In some embodiments, when used in a WAN-networking environment, the computer 20 typically includes a modem 54 (another type of communications device) or any other type of communications device, e.g., a wireless transceiver, for establishing communications over the wide-area network 52, such as the internet. The modem 54, which may be internal or external, is connected to the system bus 23 via the serial port interface 46. In a networked environment, program modules depicted relative to the computer 20 can be stored in the remote memory storage device 50 of remote computer, or server 49. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate example embodiment.

The invention claimed is:

1. A system comprising:
a hardware computer processor configured to:
enable a user to create an electronic mail message;
lookup or receive a user security token for the user;
enable a user to label the electronic mail message using a classification line and apply a user security level from the user security token as metadata to the electronic mail message;
analyze the electronic mail message to determine an adjudicated security level as a function of content of the electronic mail message;
record an electronic mail message identifier and the adjudicated security level;
compare the user security token with the adjudicated security level;
validate the user security level of the electronic mail message with a mail security level as a function of the comparison of the user security token with the adjudicated security level;
lookup a recipient security level;
compare the recipient security level with the mail security level of the labeled electronic mail message;
remove the recipient from the labeled electronic mail message or maintain the recipient on the labeled electronic mail message as a function of the comparison of the recipient security level with the mail security level of the labeled electronic mail message;
transmit a message to a security officer as a function of the comparison of the user security token with the adjudicated security level and the comparison of the recipient security token with the mail security level of the labeled electronic mail message; and
transmit the labeled electronic mail message to the recipient when the recipient is maintained on the labeled electronic mail message.

2. The system of claim 1, wherein the computer processor is configured to check for the user security token in connection with the creation of the electronic mail message; and wherein when the creation of the electronic mail message does not include a user security token, the computer processor is configured to generate a user security token.

3. The system of claim 1, wherein the computer processor is configured to automatically generate the user security token when the user logs on to the system.

4. The system of claim 1, wherein the user security token and the adjudicated security level comprise a first portion relating to a security clearance and a second portion relating to a security caveat.

5. The system of claim 4, wherein the security clearance comprises one or more of unclassified, confidential, secret, or top secret, and the security caveat comprises a particular topic.

6. The system of claim 1, wherein the user security token comprises a first portion relating to a user security clearance and a second portion relating to a device security clearance.

7. The system of claim 6, wherein the device security clearance comprises one or more of an Internet Protocol address, a public security key, and a private security key.

8. The system of claim 1, wherein the user security token or the adjudicated security level for the electronic mail message is stored as metadata associated with the electronic mail message.

9. The system of claim 1, wherein the computer processor is configured to store the document at a user security token level or the adjudicated security level as a function of a decision by the security officer.

10. The system of claim 1, wherein the analyzing by the computer processor comprises scanning the electronic mail message for an appearance of one or more keywords, each of the one of more keywords associated with a particular security level.

11. The system of claim 1, wherein the user security token is generated by a union of a user security clearance and a device security clearance, the union comprising a least security clearance between the user and the device.

12. The system of claim 1, wherein the computer processor is configured to generate a workflow process; and wherein the workflow process is provided to the security officer.

13. The system of claim 1, wherein the computer processor is configured to:
generate the user security token by compiling a user security clearance, one or more user security caveats, a device security clearance, and one or more device caveats into a group; and
transferring ownership of the document from the user to the security officer.

14. The system of claim 13, wherein the computer processor comprises a Sharepoint® system.

15. The system of claim 1, wherein the computer processor is configured to monitor an electronic mail server to identify the creation of the electronic mail message, and to invoke the analysis and adjudication upon the identification of the creation of the electronic mail message.

16. The system of claim 1, wherein the computer processor comprises one or more of a hosting processor for a file management system, a directory domain controller, and a security processor in communication with the directory domain controller.

17. The system of claim 16, wherein the security processor is configured to acquire security token information from the directory domain controller, and wherein the security processor is configured to transmit the security token to the hosting processor.

18. The system of claim 1, comprising one or more of a calendar functionality, a contact functionality, and a voice messaging functionality.

* * * * *

UNITED STATES PATENT AND TRADEMARK OFFICE
CERTIFICATE OF CORRECTION

PATENT NO. : 8,978,124 B2  Page 1 of 1
APPLICATION NO. : 13/653049
DATED : March 10, 2015
INVENTOR(S) : Bradley, II et al.

It is certified that error appears in the above-identified patent and that said Letters Patent is hereby corrected as shown below:

In The Specification

In column 4, line 45, delete "PM" and insert --PKI--, therefor

In column 6, line 3, delete "PM" and insert --PKI--, therefor

In column 7, line 67, delete "brower" and insert --browser--, therefor

In column 12, line 30, delete ""listens"" and insert --"ListItem"--, therefor

In column 25, line 2, delete "75-bland" and insert --75-81 and--, therefor

Signed and Sealed this
Twenty-sixth Day of January, 2016

Michelle K. Lee
*Director of the United States Patent and Trademark Office*